United States Patent [19]
Brown et al.

[11] Patent Number: 5,299,577
[45] Date of Patent: Apr. 5, 1994

[54] APPARATUS AND METHOD FOR IMAGE PROCESSING INCLUDING ONE-DIMENSIONAL CLEAN APPROXIMATION

[75] Inventors: Fredrick B. Brown, Reno, Nev.; Nathan Cohen, Belmont, Mass.

[73] Assignee: National Fertility Institute, Greenbrae, Calif.

[21] Appl. No.: 993,684

[22] Filed: Dec. 21, 1992

Related U.S. Application Data

[63] Continuation-in-part of Ser. No. 815,509, Jan. 2, 1992, which is a continuation-in-part of Ser. No. 508,131, Apr. 16, 1990, Pat. No. 5,111,823, which is a continuation-in-part of Ser. No. 341,047, Apr. 20, 1989, abandoned.

[51] Int. Cl.$^5$ ................................................ A61B 8/00
[52] U.S. Cl. .................................. 128/660.07; 73/602
[58] Field of Search ............... 128/660.07; 73/602; 364/413.25

[56] References Cited

U.S. PATENT DOCUMENTS

| | | | |
|---|---|---|---|
| 4,277,367 | 7/1981 | Madsen et al. | 252/408 |
| 5,105,814 | 4/1992 | Drukarey et al. | 128/660.07 |
| 5,111,823 | 5/1992 | Cohen | 128/660.07 |

Primary Examiner—Francis Jaworski
Attorney, Agent, or Firm—Flehr, Hohbach, Test, Albritton & Herbert

[57] ABSTRACT

An apparatus (10) and method for real-time reduction of noise components from echographic images. A plurality of scan line processor circuits (22) are connected through an interface (18) to an echographic imaging apparatus (20), such as an ultrasonic imaging device. Each scan line processor circuit (22) receives a row of dirty image signals (24) and simultaneously and independently performs a one-dimensional side lobe subtraction of noise components (a deconvolution of the dirty beam pattern) from the row of signals using a CLEAN algorithm. After subtraction, the resulting clean components are convolved by the scan line processor circuits (22) with a clean beam pattern to smooth the image for display. Finally, the clean image signals optionally can be masked by a masking multiplier (52) to remove processing artifacts and compressed by a compression device (56) to enhance contrast. The resulting masked and compressed clean image signals (26) are then displayed on a display device (17,20). A sufficient number of scan line processor circuits (22), relative to the number of rows in a complete image frame, are provided to effect real-time processing of image frames.

71 Claims, 11 Drawing Sheets

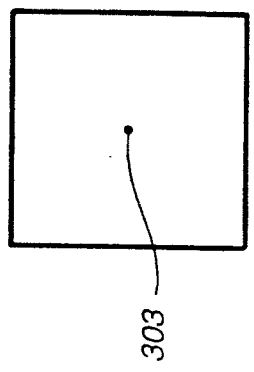
FIG._1B
*PRIOR ART*
PHYSICAL SPACE WITH FEATURE
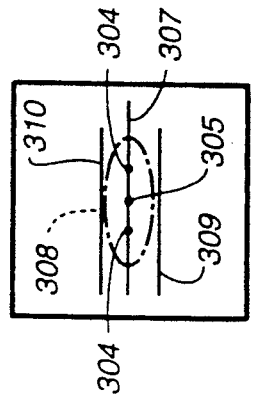
FIG._1D
*PRIOR ART*
DEGRADED IMAGE
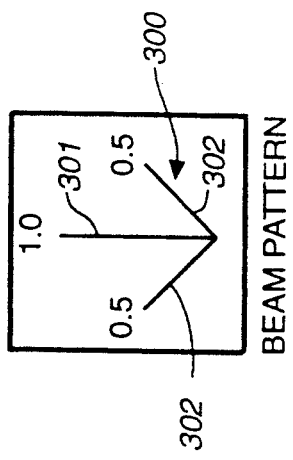
FIG._1A
*PRIOR ART*
BEAM PATTERN
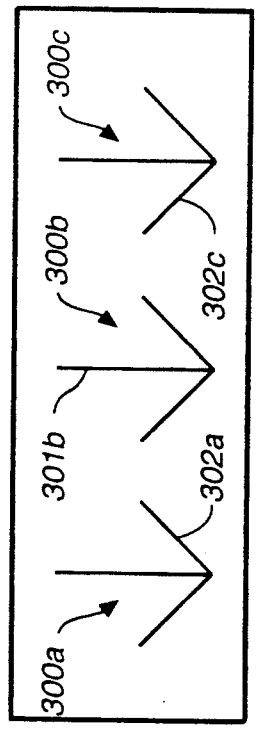
FIG._1C
*PRIOR ART*
THREE SIDE-BY-SIDE TRANSDUCERS

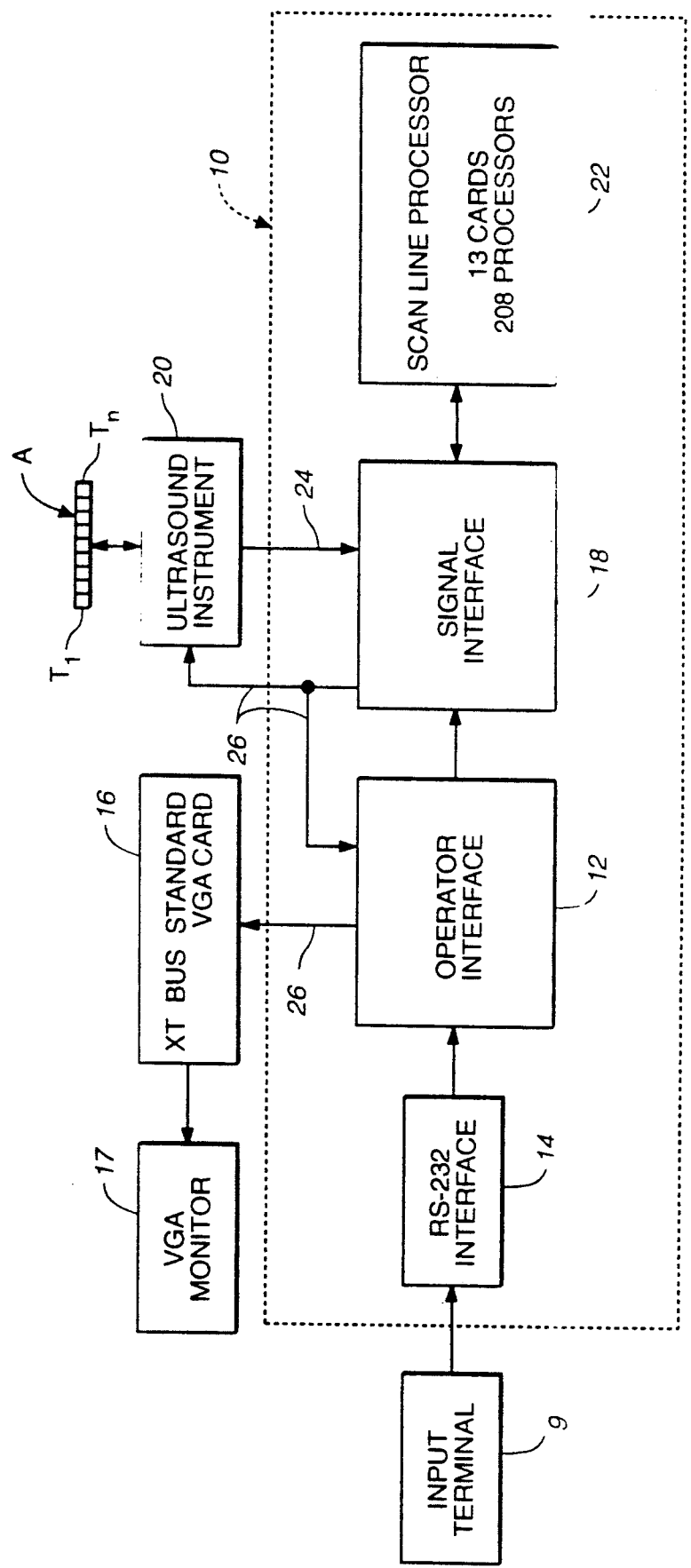
FIG._2

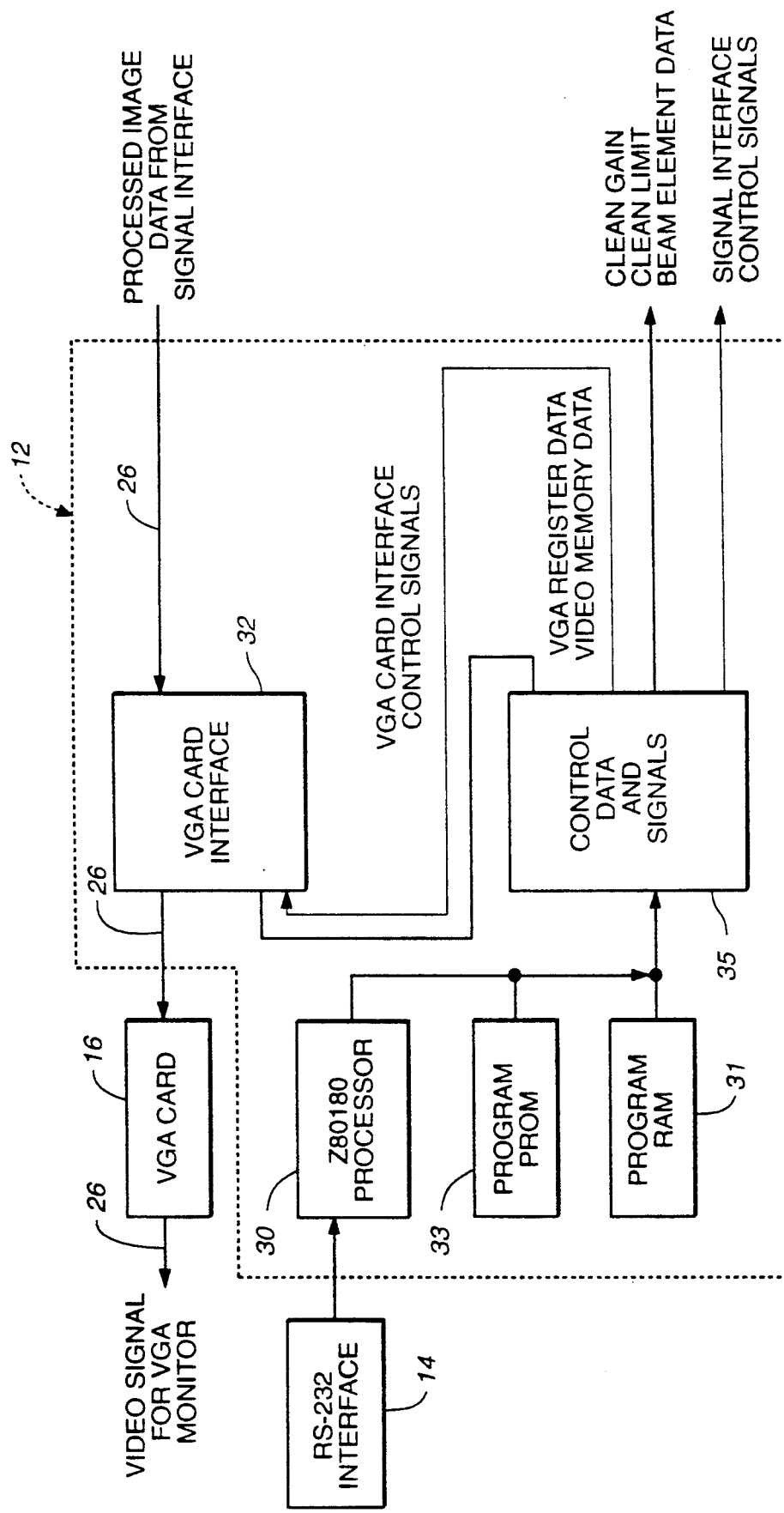
FIG._3

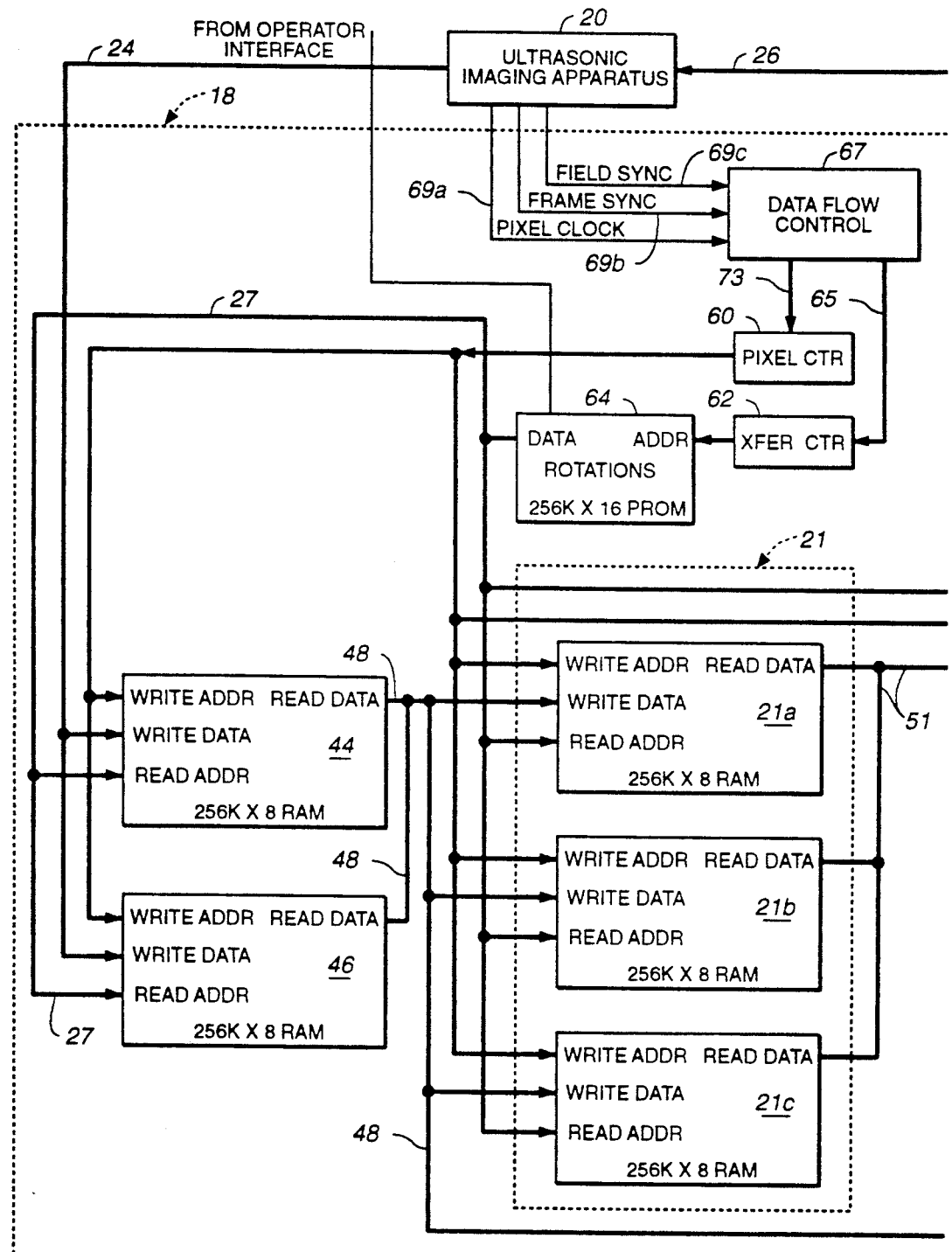
FIG._4A

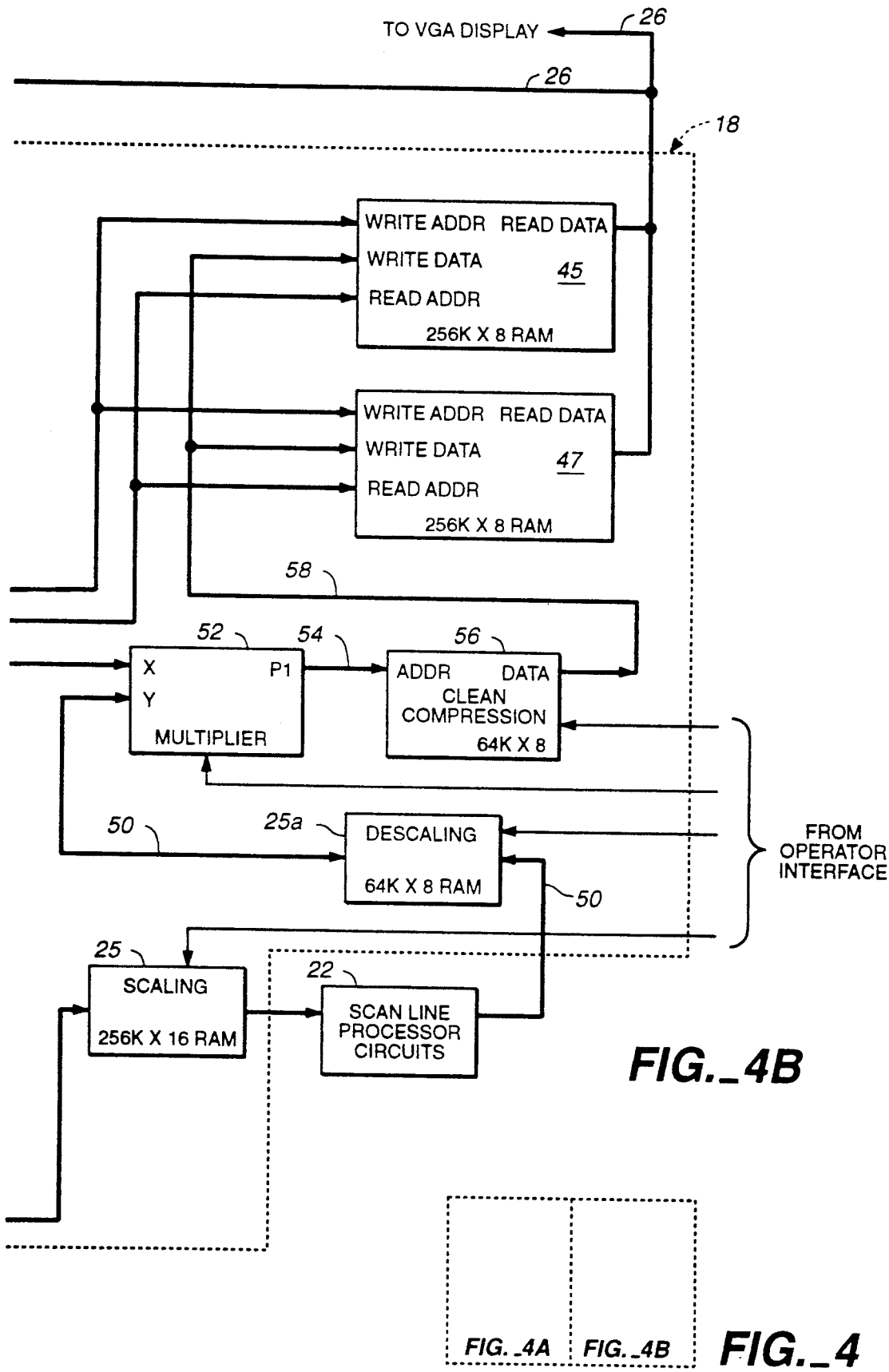
FIG._4B
FIG._4

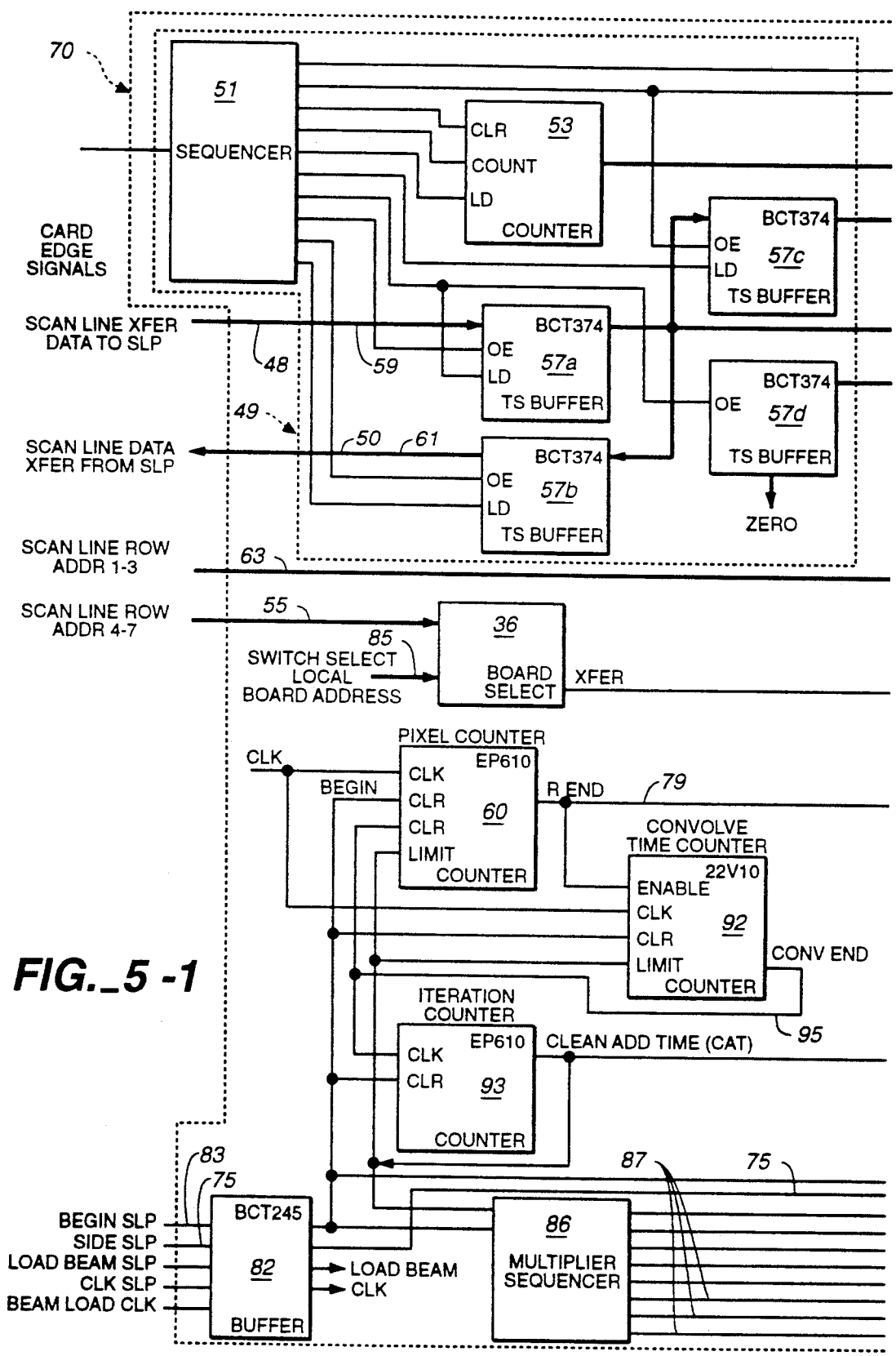
FIG._5-1

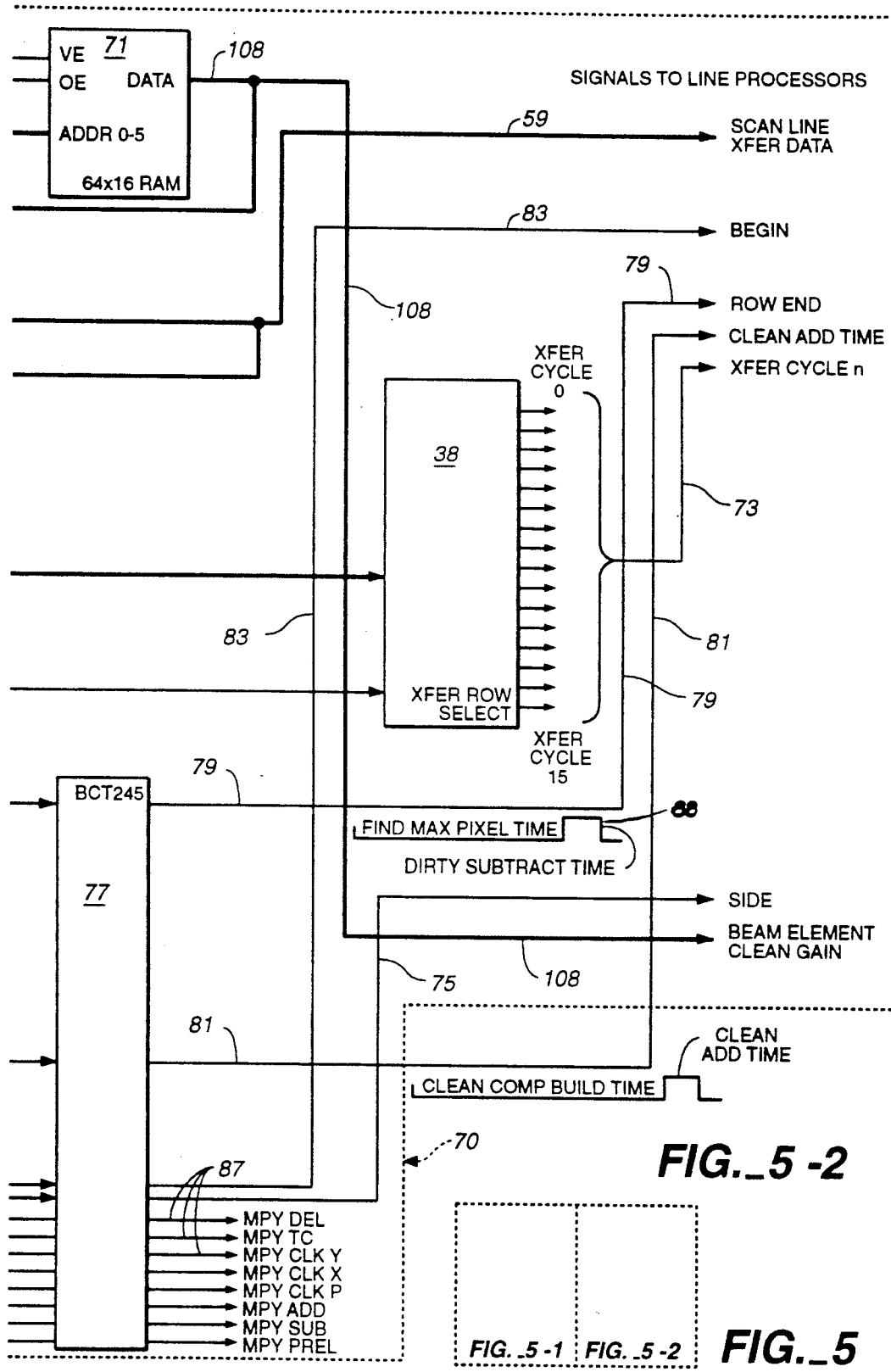
FIG._5-2
FIG._5

INTERFACE
RAM 71 SEGMENTS
```
128 ┌
    │
    │
    │
 64 ├ CLEAN BEAM
    │
    │
  1 ├ DIRTY BEAM
  0 └ CLEAN GAIN
```
SCAN LINE PROCESSOR
RAM 78 SEGMENTS
BEGIN ADDRESS
```
         ┌ 3584 UNUSED
         │ 3072 CLEAN IMAGE
  SIDE 1 │ 2560 CLEAN COMPONENTS
         │ 2559 CLEAN LIMIT
         └ 2048 DIRTY IMAGE
         ┌ 1536 UNUSED
         │ 1024 CLEAN IMAGE
  SIDE 0 │ 512  CLEAN COMPONENTS
         │ 511  CLEAN LIMIT
         └ 0    DIRTY IMAGE
```
*FIG._5A*          *FIG._6A*
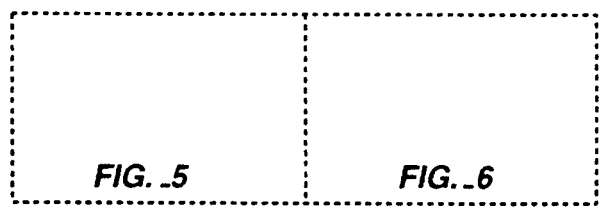
*FIG._6B*

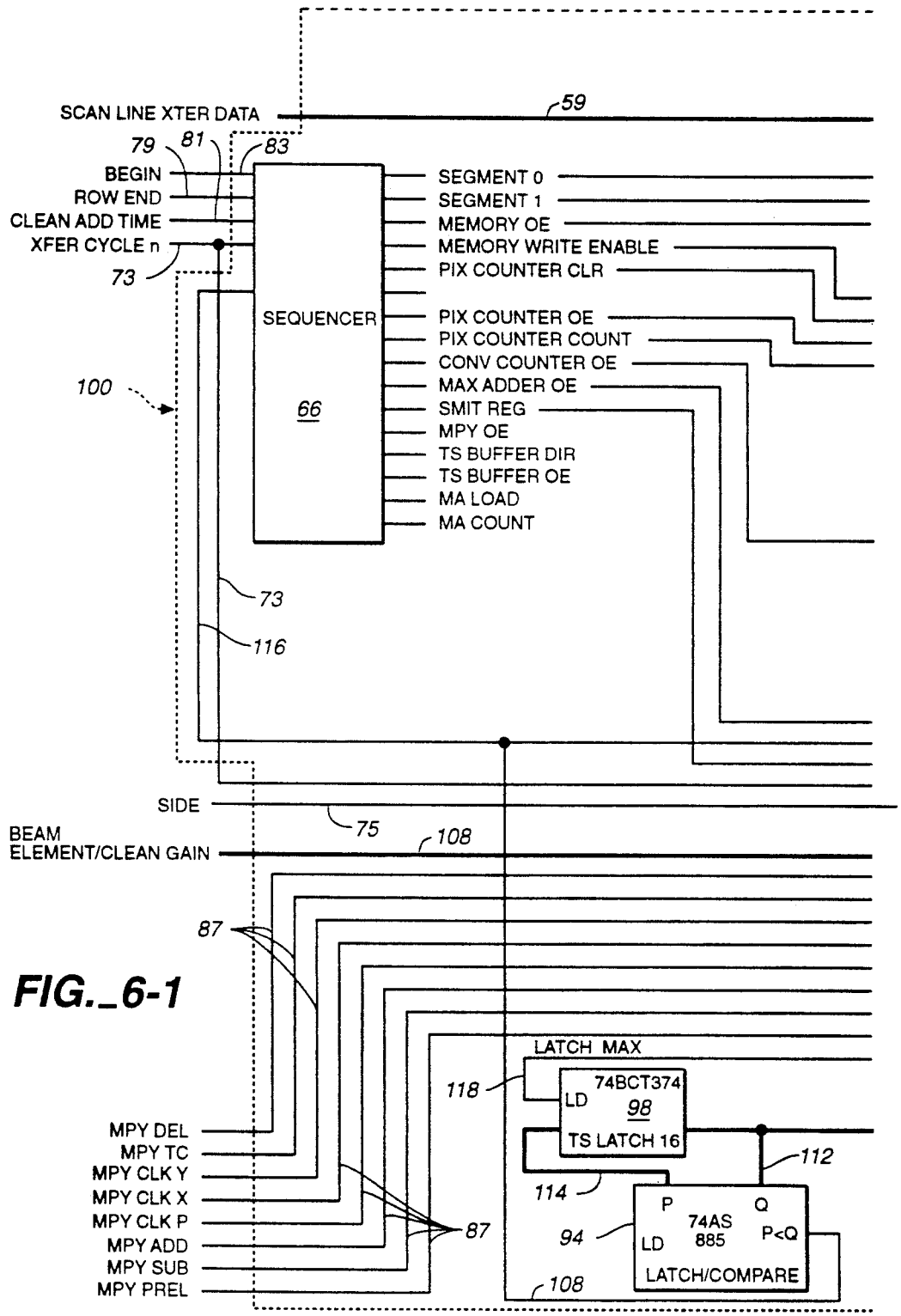
FIG._6-1

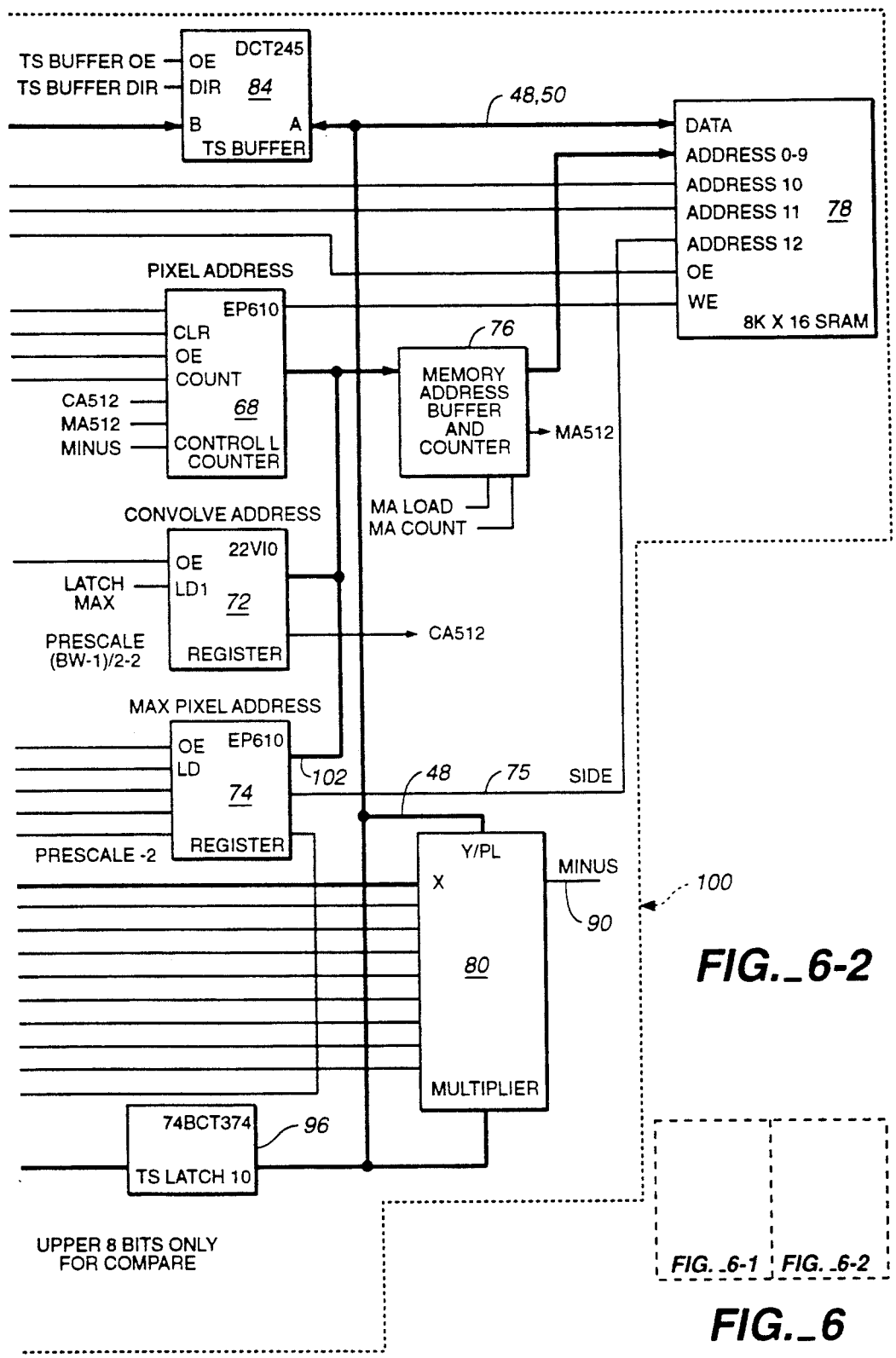
FIG._6-2
FIG._6-1 | FIG._6-2
FIG._6

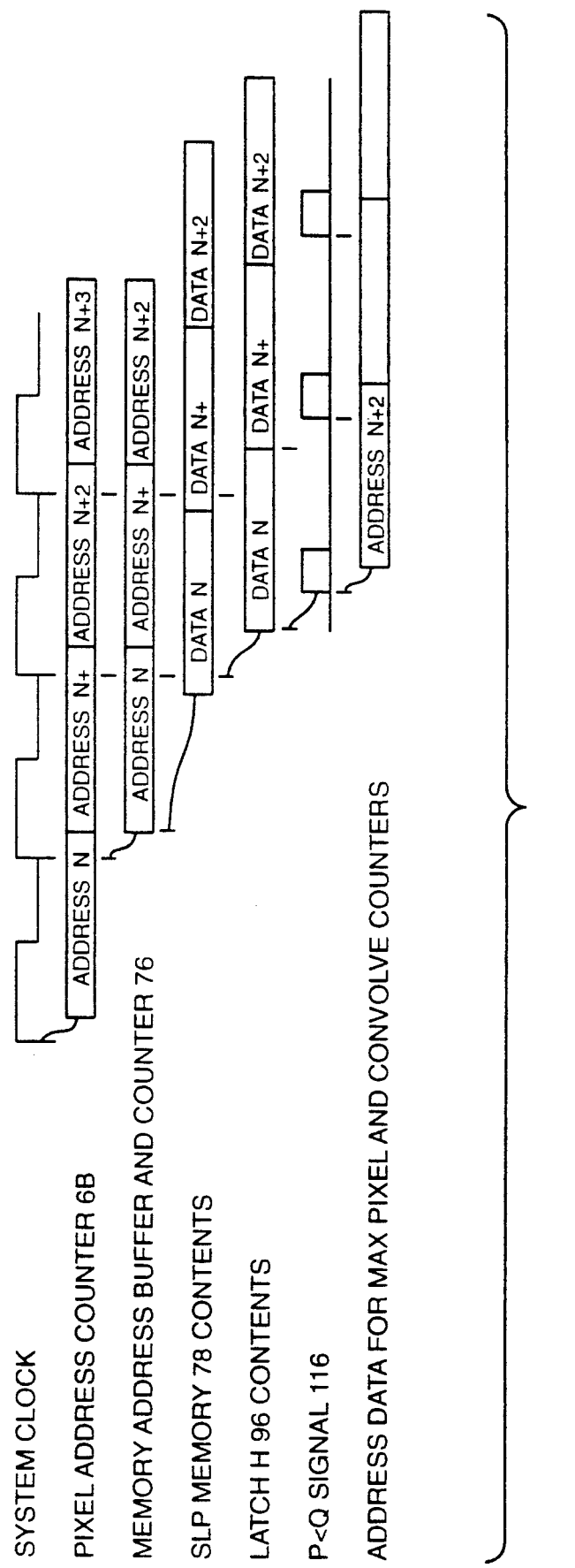
FIG._7

APPARATUS AND METHOD FOR IMAGE PROCESSING INCLUDING ONE-DIMENSIONAL CLEAN APPROXIMATION

RELATED APPLICATIONS

This application is a continuation-in-part application based upon application Ser. No. 07/815,509, filed Jan. 2, 1992, entitled METHOD AND APPARATUS FOR PROCESSING IMAGES, which application was a continuation-in-part application based upon application Ser. No. 07/508,131, filed Apr. 16, 1990, entitled METHOD AND APPARATUS FOR GENERATING ECHOGRAPHIC IMAGES, now U.S. Pat. No. 5,111,823, which application was a continuation-in-part application of parent application Ser. No. 07/341,047, filed Apr. 20, 1989, entitled APPARATUS AND METHOD FOR GENERATING ECHOGRAPHIC IMAGES, now abandoned.

BACKGROUND ART

The prior Related Applications describe in detail various signal processing methods and apparatus which are useful in reducing the noise components of signals from synthesized apertures, and most particularly from signal generated by multiple transducer, ultrasonic echographic equipment. These applications hereby are specifically incorporated by reference into the present application.

The present application is directed to an apparatus and method for implementing the noise-reduction processes and apparatus of said Related Applications in a real-time, signal processing system. As used herein, the expression "real-time" shall mean the display of at least about 15 complete image frames per second. It will be understood that faster frame rates are desirable and smooth the movement of the images of moving targets or objects.

Noise-reduction processes, such as side lobe subtraction and hybrid mapping, present a substantial computing burden because they are based upon iterative techniques. For example, using a side lobe subtraction process employing the CLEAN algorithm, normally commences with the step of identifying the brightest or highest intensity data point or pixel on the entire data map or image frame. For a typical video display terminal, each scan line or row in the video display includes over 400 pixels and a typical display screen includes over 400 scan lines or rows. Thus, there are more than 160,000 pixels or data points on a display screen that must be examined for their intensity and compared to each other to find the highest intensity pixel.

Sonographic imaging usually employs polar coordinates to produce a sector-shaped image display. Thus, in the rows or scan lines of pixels close to the transducer array, the pixels at the sides of each row or line will not display data. The complete image map in sonographic imaging, therefore, can have fewer than 160,000 data points to compare for the brightest point, but it still contains a very substantial and burdensome number of data points. Moreover, in higher resolution displays, for example, VGA displays with 480 rows and 640 pixels per row, the potential number of data points increases to over 300,000.

Once the highest intensity pixel on the map is identified, noise around the brightest data point can be deconvolved or subtracted using a noise-reduction algorithm, such as a CLEAN algorithm or a maximum entropy algorithm. This noise-reduction step involves further computer burden, but the CLEAN algorithm is the least burdensome and effects substantial noise reduction. After the first noise-reduction subtraction using the CLEAN algorithm, the map is again scanned for the next brightest, highest intensity, data point and noise is deconvolved from around that data point. As many as 600 or more iterations may be employed to reduce noise in the mapped image.

This noise-reduction process, therefore, can be adapted and is readily suited for use to process image data which does not need to be displayed in real-time. For example, a single frame can be processed to provide the viewer with a snap shot of the target having significantly increased clarity and resolution. Solving the computing burden in a manner allowing real-time displays, however, is much more difficult, particularly if a computer or signal processing apparatus of modest size and cost are to be employed.

The apparatus and method of the present invention and particularly well-suited to sonographic and echographic applications where real-time display is more important. The present process and apparatus may have application in other areas, and by describing the preferred embodiment in relation to ultrasonic imaging, it is not meant to limit the present process and apparatus.

Briefly, by way of further background to the preferred embodiment, the basic noise-reduction problem found in sonography can be described. Additional detail and theory are found in the Related Applications.

Sonography, as well as other types of imaging, uses a plurality of transducers to illuminate a physical imaging space and to receive return echo signals from features within that space. The transducers used are not perfectly directional. That is, for any given pointing angle and moment in time they illuminate and receive echoes from some three-dimensional volume of the imaging space, rather than an ideal point in space. The fact that the transducers see a volume, rather than a point, limits their resolution to physical features that are larger than the volume that the transducer sees at a particular moment in time.

A sonographic image is commonly displayed in polar $(r,\Theta)$ coordinates in two dimensions, with one dimension being angular (related to the transducer pointing angle) and the other being radial (related to distance from the transducer). In current sonographic imaging systems the radial resolution is quite good compared to the angular resolution. The angular resolution consists of two components, one of which is "into the image" in a two-dimensional display and thus cannot be seen in the two-dimensional presentation. The "into the image" dimension can still degrade the image, but the resolution of commonly used sonographic transducers is considerably better in that "into the image" dimension than in the dimension that can be seen.

Consider a single sonographic transducer that has a directional sensitivity pattern 300, as shown in FIG. 1A. This transducer "sees" in three directions for any given pointing angle. Its directional sensitivity is referred to as its "beam pattern" or "point spread function," which may be schematically represented as a three element pattern with a main lobe 301 and two equal side lobes 302 that are 0.5 times as sensitive as main lobe 301. FIG. 1B shows a small physical feature or target object 303. If physical feature 303 is examined by three side-by-side transducers having beams 300a, 300b and 300c (FIG. 1C), the image resulting can be seen in FIG. 1D.

Two "ghost" features 304, observed to the right and left of the central bright point 305, are the result of the side lobes 302a and 302c of the adjacent transducers seeing actual feature 303, while central transducer main lobe 301b creates central bright point 305 in FIG. 1D. Side lobe subtraction using the CLEAN algorithm is one means whereby an image that is degraded by an imperfect transducer, or by a synthesized aperture formed by a plurality of transducers, may be improved when the transducer's or the array of transducer's directional pattern can be determined or reasonably approximated. If the transducer or array beam pattern is known, and an image such as FIG. ID is observed, then the ghost figures may be removed from the image. A side lobe subtraction of the ghosts can be accomplished with an algorithm such as the CLEAN algorithm, which process is also known as "deconvolution" of the noise or "beam subtraction."

A real image is much more complex, since it has many physical features, and the beam element pattern is much more complex, since it is formed by a large array of transducers. The simple ghost features, therefore, become a generalized image blur. The CLEAN algorithm uses an iterative process on the real image, also called the "dirty image" to progressively remove the blurring. The CLEAN algorithm finds the brightest pixel in a dirty image and assumes that there is a real physical feature at that location. It then deconvolves a percentage of the beam pattern (for example, 30 percent) out of the dirty image centered on that bright pixel. The CLEAN algorithm stores where the bright pixels were found and what their intensities were (times the same percentage) in order to reconstruct the image when the deconvolution phase is complete.

When the deconvolution phase is complete, the original dirty image has been reduced in intensity to some noise floor (which may be 0) and a second image (comprised of the "clean components"), consisting of found bright pixels and their intensities times the percentage or gain. The noise floor or remainder usually is not used to reconstruct the image.

The clean component's image can be viewed and recognized as a deblurred version of the original dirty image. However, the clean components image generally has a grainy appearance and is often unsatisfactory for use in that form. The preferred final step in the CLEAN algorithm, therefore, is to smooth the clean component image by convolution with a beam element pattern that renders the image more pleasing to the viewer. This final image in which the beam element pattern has been convolved back into the clean components is called the "clean image."

The clean image may contain some features that are not actually physical features, called "artifacts." These artifacts can be reduced or eliminated by a procedure termed "masking." Masking is not part of the CLEAN noise-reduction algorithm itself, but is an additional step after noise-reduction processing. When noise reduction is complete, the clean image is multiplied, on a pixel by pixel basis, by a copy of the original dirty image that was saved for this purpose, and is divided by a scaling factor, in order to enhance the contrast of the resulting masked image frame. The final result is a cleaned and masked image. The masking process is described in much greater detail in Related application Ser. No. 07/815,509, previously incorporated herein by reference and it will not be set forth in detail herein.

DISCLOSURE OF THE INVENTION

Accordingly, it is an object of the present invention to provide an apparatus and method for reduction of the noise component in echographic images at a rate which will enable real-time display of successive noise-reduced image frames.

It is a further object of the present invention to provide a noise-reduction apparatus for an ultrasonic imaging apparatus which is relatively inexpensive to construct and can be retrofit to existing imaging apparatus to significantly reduce noise in images produced thereby.

The apparatus and method of the present invention have other objects and advantages which will become apparent from or are set forth in detail in the accompanying drawing and following description of the Best Mode of Carrying out the Invention.

The apparatus of the present invention for reducing noise from echographic images is comprised, briefly, of a plurality of scan line processors connected so that each processor receives an individual row of dirty image signals, and each processor is formed to deconvolve noise from each of said rows of dirty image signals independently of the deconvolution of noise from other rows. The preferred apparatus employs a one-dimensional CLEAN algorithm to reduce noise in a single row of signals. The noise-reduction apparatus thereafter convolves a clean beam pattern back into the row of signals and reforms the complete image frame for display. Preferably, the clean image signals also are masked after convolution of the beam pattern to remove processing artifacts.

In the preferred embodiment, the noise-reduction apparatus contains a signal interface section that communicates data between the ultrasonography instrument and distributes image data for processing within the noise-reduction apparatus. A plurality of scan line processor cards perform the actual CLEAN image processing. The signal interface section embodies the logic circuitry necessary to process images as entire frames. It buffers image data, performs image coordinate and pixel intensity transformations, accomplishes the masking step and generates control signals that synchronize the work of the scan line processor cards. The scan line processor cards embody the logic circuitry necessary to process images as individual rows of pixel data. A plurality of scan line processors work simultaneously on rows of image data that are a constant distance from the ultrasonography transducer array to accomplish the CLEAN algorithm.

The process for real-time display of noise-reduced echographic signals of the present invention includes the step of parallel processing individual rows of signals comprising the image frame by deconvolving the noise components therefrom based upon the assumption that such noise components have a one-dimensional effect on the image frame, which effect is substantially limited to individual signal rows. The process further preferably include convolving a smoothing clean beam pattern back into the image signals and masking the image signals for removal of signal processing artifacts.

BRIEF DESCRIPTION OF THE DRAWINGS

FIG. 1A is a schematic representation of the directional sensitivity pattern for a single transducer, such as a prior art ultrasonic transducer.

FIG. 1B illustrates a point target or physical feature.

FIG. 1C is a schematic representation of three transducer sensitivity patterns pointed toward the same physical feature, such as the feature of FIG. 1B.

FIG. 1D is a schematic representation of the images of the physical feature of FIG. 1B, as seen by the transducer array of FIG. 1C.

FIG. 2 is a block diagram of a real-time ultrasonic imaging assembly constructed in accordance with the present invention.

FIG. 3 is a block diagram of the operator interface portion of the assembly of FIG. 2.

FIG. 4, 4A and 4B are block diagram of the signal interface card of the assembly of FIG. 2.

FIG. 5, 5-1 and 5-2 are block diagrams of a scan line processor interface card.

FIG. 5A is a schematic diagram of the memory addresses for the beam memory device of FIG. 5.

FIG. 6, 6-1 and 6-2 is a block diagram of one of a plurality of scan line processor employed in the apparatus of the present invention.

FIG. 6A is a schematic representation of the memory segments of one memory in the scan line processor circuits of FIGS. 5 and 6.

FIG. 6B is a map of the relationship of the circuits of FIGS. 5 and 6.

FIG. 7 is a diagram of the clocking and function sequence employed by the scan line processor of FIG. 6.

BEST MODE OF CARRYING OUT THE INVENTION

As viewed in FIG. 1D, the side lobe noise 304 of a transducer array appears to be predominately one-dimensional or to fall exactly on a common line or plane 307. In fact, however, the beam pattern or point spread function is two-dimensional about bright point 305, as indicated by broken line 308 in FIG. 1D. Moreover, the side lobe subtraction and hybrid mapping noise-reduction processes conventionally remove noise in both X and Y dimensions around point 305, which further adds to the computing burden.

The method and apparatus of the present invention achieve real-time, noise-reduced signal processing by recognizing that, while the noise around bright point 305 is two-dimensional, a very accurate approximation of the point spread or beam pattern results if it is assumed that the noise is only one-dimensional, namely, along line 307.

In prior Related Applications, the lobe subtraction process was referred to as a three-dimensional process, which it can be considered to be if out-of-the page intensity values are considered to be a dimension. For simplicity herein, however, and in light of the use of two-dimensional r, $\theta$ or X,Y displays, side lobe subtraction normally will be considered as a two-dimensional subtraction process occurring in both r and $\theta$ dimensions or in both X and Y dimensions. In the present invention, the approximation used for side lobe subtraction will be considered a one-dimensional process in which noise at various X or $\theta$ locations along a single Y row or r scan line is removed.

As viewed in FIG. 1D, two-dimensional point spread function 308 can be seen to be an ellipse having line 307 as its major axis. The width dimension of the ellipse 308 does not extend to either of adjacent lines 309 or 310. If lines 307, 309 and 310 are considered to be adjacent raster scan lines or video pixel rows in a typical video display terminal, point spread function or beam pattern 308 for conventional ultrasonic transducer arrays, in fact, will be substantially confined to a single scan line or pixel row. It will be appreciated that, as the number of video display terminal scan lines is increased (higher definition VDTs), scan lines 307, 309 and 310 would be closer together and point spread function 308 would overlap into adjacent scan lines. At present, however, very little, if any, overlap occurs from one scan line to the other. Moreover, the one-dimensional assumption of the present invention will be effective to some degree to remove adjacent row or scan line noise because each row is noise-reduced, even though independently of the other rows.

Thus, for conventional video displays and ultrasonic transducer arrays, it is possible to effect substantial noise reduction by a side lobe subtraction (and/or hybrid mapping) by assuming that the point spread function is one-dimensional, that is, an X or $\theta$ variation along a single scan line (r distance) or pixel row (Y distance) from the transducers. This assumption allows processing of the image frame on a line-by-line or row-by-row basis. By using a one-dimensional CLEAN algorithm, therefore, each raster line or pixel row in a video image frame can be noise-reduced, without considering noise overlap into adjacent scan lines or rows. This immediately reduces the computing burden for determining the brightest data point from on the order of 160,000 plus data points to about 4–600 data points, and the deconvolution computing burden is reduced from a two-dimensional deconvolution to a one-dimensional deconvolution. Thus, very substantial noise-reduction efficiency can be realized if scan lines can be noise-reduced simultaneously, and in parallel. They can be so processed, and this forms the basis for the real-time, noise-reduction processing apparatus and process of the present invention.

FIG. 2 is a block diagram of an ultrasonic imaging apparatus for real-time CLEAN processing of pixel image data. The noise-reduction apparatus, generally designated 10, includes an operator interface 12, a signal interface section 18, and scan line processor cards or an assembly of circuits 22. Operator interface 12 enables an operator to control noise-reduction apparatus 10 and it sets up a VGA card 16 so that image data may be displayed on a VGA monitor 17. Interface 12 controls an RS-232 interface 14, which allows an input terminal 9 to be connected thereto for use by the operator to control the assembly. The operator interface 12 also initializes signal interface 18 for image processing and VGA card 16 for image display.

Referring now to FIG. 3, a block diagram of operator interface 12 is shown. Operator interface 12 includes a conventional microprocessor 30, such as a Z80 processor with associated program RAM 31, program PROM 33 and control logic 35. Also associated with the operator interface is VGA card interface logic 32, which is used to configure a standard PC computer type VGA card 16 to display processed image data, indicated at 26 on input to interface 32. VGA card interface 32 buffers processed image data 26, as output from the signal interface 18, before it is input to VGA card 16. It should be noted that VGA card interface 32 is used unconventionally in that it is not connected to a PC computer type bus (nor provided as a customized chip). It is, instead, controlled directly by hardware (such as sequencers and PALs) of the VGA card interface 32 in order that it will be fast enough to display real-time data without inclusion of an expensive computer to service VGA card interface 32.

The parallel or "pipelined" processing of the present invention can be understood by reference to FIGS. 4 and 5. In FIGS. 4, 4A and 4B a block diagram of signal interface section 18 is illustrated. Signal interface 18 receives real-time, raster scan, incoming image data 24 from, for example, an ultrasound instrument 20, including an array A having a plurality of side-by-side ultrasonic transducers $T_1$ to $T_n$ (FIG. 2).

Such incoming data 24 to noise reduction apparatus 10 will be comprised of at least one of correlated amplitude signal data and correlated phase signal data. Presently, commercially available ultrasonic equipment does not include cross-correlation circuitry, and it usually provides only amplitude-based signals, but it will be understood that signal processing techniques, such as side lobe subtraction and hybrid mapping, are equally applicable to amplitude-only signal data or phase-only signal data. The apparatus set forth herein, for example, achieves substantial noise reduction at real-time rates for amplitude-only signals.

Signal interface card 18 transfers images to and from scan line processor card 22, which performs a CLEAN noise deconvolution of the incoming image data 24 and transmits processed image data 26 back, via signal interface card 18, to the ultrasound instrument 20 and to VGA card 16 for display on VGA terminal 17.

The ultrasonic instrument 20 can be any one of a number of commercially available ultrasonic imaging apparatus, and such apparatus will normally include a video display unit for display of images, usually in shades of gray. Thus, pixel intensity in most commercially available ultrasonic imaging apparatus 20 can be displayed in any one of 64 to 256 shades of gray.

It is possible in the present invention to use the video display of ultrasonic apparatus 20, but it is believed to be preferable and advantageous to provide a color monitor 17 for false color images, preferably with a potential for greater resolution than the monitors found in most ultrasonic imaging apparatus 20. Feeding clean or processed images 26 to both imaging apparatus 20 and monitor 17 allows two screens to be viewed, but this is optional. It will be understood, therefore, that the present invention does not require a color monitor (with VGA card 16), nor does it require feedback to the display device in imaging apparatus 20. Either display, or both, can be employed, and it is an important feature of the present invention that the real-time processing apparatus provided as an add-on or accessory to conventional ultrasonic imaging equipment, with or without VGA terminal 17.

In order to effect simultaneous parallel processing, incoming image data 24 is stored in an image processing pipeline. Briefly, the image processing pipeline consists of: (Segment 1)—two incoming data RAMS 44 and 46, one of which is receiving image signals 24 from the ultrasound apparatus 20, while the other is simultaneously making a coordinate transformation from polar (r,Θ) data to Cartesian (X,Y) data (herein also referred to as "rotating" the data) and transmitting the rotated previous image data 48 to a scan line processor circuits or cards 22; (Segments 2 and 4)—a two sided memory 78 (shown in FIG. 6 and part of the scan line processor cards) wherein one side of the memory simultaneously receives dirty image data 48 from signal interface 18 and sends clean image data 50 back to signal interface 18; (Segment 3)—the alternate side of the scan line processor memory 78 builds the clean image; and (Segment 5)—two result RAMS 45 and 47, one of which is receiving and derotating final processed data 58 from a clean compression RAM 56, while the other is transmitting processed data 26 to ultrasound apparatus 20 and VGA terminal 17 for display.

Hence, five operations are performed in order to process an incoming image, namely,: (1) receive incoming dirty image signals or data 24 from ultrasound instrument 20, (2) transmit rotated dirty image signals or data 48 to scan line processor card 22, (3) perform a CLEAN beam subtraction process, (4) transmit processed clean image signals or data 26 back to signal interface 18, and (5) transmit the processed and derotated image signals or data 26 to ultrasound apparatus 20 and VGA terminal 17 for display. In the preferred embodiment, operations 2, 3 and 4 require 1/15 of a second, while operations 1 and 5 require 1/30 of a second. In order to provide processed image data back to the displays at a 1/15 of a second rate, rather than 4/15 (1/30+1/15+1/15+1/15+1/30), operations must occur simultaneously (in a pipeline). The processed data 26 is displayed at a 1/15 of a second rate, delayed in time from the unprocessed data by 6/15 of a second. Note, that in the present process each processed image data set (image frame) is presented for two 1/30 of a second periods, and every other incoming data set (image frame) which is taken by the ultrasonic apparatus at 1/30 of a second, is ignored.

Signal interface 18 includes a data flow control device 67 which is connected to receive a pixel clock signal 69a, frame sync signal 69b and field sync signal 69c from ultrasound instrument 20. The pixel clock signal controls the clocking in of incoming dirty image signals 24 from the ultrasound instrument 20 into signal interface 18 and, more particularly, to a dirty data compression RAM 25 and then to incoming data random access memories 44 and 46. The pixel clock signal also controls the clocking in of processed or clean image signals 26 back to ultrasound instrument 20. Data flow control device 67 logically combines the pixel clock, the frame sync and the field sync signals 69a, 69b and 69c to generate pixel counter control signals 73 and transfer counter control signals 65, which are respectively input to a pixel counter 60 and to a transfer counter 62.

The speed for image processing is determined by the frame rate of the ultrasound instrument 20, which for many commercially available ultrasonic imaging instruments is 30 or fewer frames per second. The frame and field sync signals 69b, 69c allow the logic in data flow control device 67 to determine when a new field time occurs and which field (odd or even) of the frame will follow. Pixel counter 60 is reset at the beginning of each field by the field sync signal while the frame sync signal provides the most significant bit for the pixel counter 60. The frame sync is high for one complete field and low for the next field.

When the frame speed of imaging apparatus 20 is 30 frames per second, every frame of data from the ultrasound instrument 20 is read into input RAMs 44 and 46, but only every other frame is processed. In the preferred embodiment, incoming image data 24 is stored in two 256K×8 bit RAMs 44 and 46, which are programmed such that the contents of each address are equal to each pixel's intensity. Pixel counter 60 is used to sequentially address each memory location as raster scan data. Dirty image pixel signals 24 are read alternately into one of two input RAMs 44 and 46 from ultrasound instrument 20. As incoming signals or data 24 are being read into one of input RAMs 44 and 46, the previously stored image data 48 is being read out of the other RAM 44 or 46 as dirty image signals 48. Hence, two frames of incoming image data 24 are stored at a time.

Pixel counter 60 is also used to sequentially address each result RAM 45 and 47 memory location as the raster scan processed image pixel signals or data 26 are alternately read out from one of result RAMs 45 or 47 to ultrasound instrument 20. In the preferred embodiment, two input RAMs 44 and 46 and two result RAMs 45 and 47 are employed so that incoming data 24 and output image data 26 can be simultaneously transferred to and from the ultrasound instrument and the scan line processor circuits. The RAMs 44, 46, 45 and 47 isolate the speed of data transfer between ultrasound instrument 20 from the speed of data processing by noise-reduction apparatus 10.

Data flow control device 67 determines, by counting frames, which input RAM, held dirty data RAM, generally designated 21, and result RAM are active for data transfer, and determines the direction of transfer.

Since most commercially available equipment produces image signals in polar coordinates, transfer counter 62 and data coordinate transformation or rotation PROM 64 convert the incoming (r,Θ) raster scan data 24 to rotated or Cartesian X,Y coordinate system data. Counter 62 also controls the transmission of the dirty data 48 to the scan line processor card 22 and to held data RAM assembly 21. Transfer counter 62 is controlled by data flow control device 67 during image processing. The data flow control device resets transfer counter 62 at the start of processing for an image frame. Thereafter, it advances transfer counter 62 at, in the preferred embodiment, every fourth system clock. Four system clocks are required because four steps are necessary for data transfer and initialization by scan line processor circuits 22, as set forth below.

Transfer counter 62 provides addressing for rotation PROM 64, and rotation PROM 64 outputs an X,Y address signals 27, which correspond to the addresses of the r,Θ raster scan data, but in the X,Y coordinate system. As set forth in Related application Ser. No. 07/815,509, processing can also proceed in polar coordinates by using a side lobe subtraction algorithm expressed in polar coordinates. Use of polar coordinates, however, is less desirable since it results in additional computing burden. It should be noted further that output image data 26 can be displayed in X,Y or Cartesian coordinates without coordinate transformation by rotation PROM 64 back to polar coordinates, but physicians are more accustomed to viewing r,θ displays.

As is described in Related application 07/815,509, non-standard coordinate transformation also can be employed as part of the signal processing technique. Thus, polar coordinate data can be warped or transformed to Cartesian-like coordinates by non-standard coordinate transformation algorithms. The expressions Cartesian and Cartesian-like polar and polar-like, shall include such warped Cartesian and warped polar space transformations.

In the preferred embodiment, however, X,Y, address signal 27 is used to transfer incoming image data 24 and output image data 26 between the input RAMs, result RAMS and scan line processor such that each scan line processor gets only pixel data that is a constant Y distance or in the same pixel row from ultrasound transducer array 25. As used in this application, however, the expressions "row," "signal row" and "row of signals" shall be deemed to include both scan lines in polar coordinates and pixel rows in Cartesian coordinates. If deconvolution is occurring in polar coordinates, a row of data at the same radial distance, r, from the transducers will be processed, and if processing occurs in Cartesian coordinates a row of signals at the same Y distance from the transducers is being processed.

Since a polar coordinate display is generally sector-shaped, the number of valid pixel data points varies with radial distance from the transducer array. Near the transducer array there are fewer valid pixels and distant from the transducer array there may be more than a scan line processor card 22 can process. An additional function of rotation PROM 64 is to supply the address of a constant zero value pixel for positions where no valid pixel data are present, for example, outside the sector-shaped image area. A further function of rotation PROM 64 is to signal data flow control device 67 when pixel data must be replicated into an adjacent result RAM location because it was not processed by any scan line processor. As illustrated in Related application Ser. No. 07/815,509, the coordinate transformation from polar to Cartesian coordinates results in X,Y pixels being present which have no exact corresponding r,Θ data point. Thus, PROM 64 also fills in these holes or pixels not processed in X,Y coordinates by replicating data from adjacent pixels that have been processed. A RAM could also be employed to effect data averaging of adjacent pixels instead of mere replication.

Optionally, a data compression RAM 25 can be provided either in advance of input RAMs 44 and 46 or preferably as shown in FIG. 4 in advance of scan line processor circuits 22. Compression RAM 25 provides intensity scaling of data signals to compensate for image intensity nonlinearities with respect to the beam patterns used to process the image. Placing compression RAM 25 to receive rotated data 48 in advance of scan line processors 22 allows input RAMs 44 and 46 and held dirty signal RAMs 21a, 21b and 21c to be narrower than if the compression takes place before input RAMs 44 and 46.

If compression RAM 25 is employed, it is further preferable to provide a descaling RAM 25a between scan line processors 22 and multiplier 52 to remove the compression or scaling before masking and display. Compression RAMs 25 and 25a may be programmed with compression factors via operator interface 12. If no compression is desired, the contents of compression RAM 25 and 25a are equal to the RAM addresses resulting in a one-to-one, or no data, compression.

The dirty data 48 is transmitted from the input RAMs 44 and 46 to scan line processor cards 22 and to a held dirty data RAM assembly 21. In the preferred embodiment, held dirty data RAM assembly 21 is comprised of a plurality of RAMs 21a, 21b and 21c. The dirty data signals 48 are stored in one of a plurality of the held dirty data RAMs 21a, 21b and 21c. In the preferred embodiment, there are three held dirty data RAMs, each being a 256K×8 bit RAM. The held dirty data RAM assembly is used to hold dirty data 48 for the masking step of the image processing (discussed below). In the preferred embodiment, there are three RAMs 21a, 21b and 21c since there are three image frames in the scan line processor card portion of the pipeline in the preferred embodiment.

The three frames in scan line processor cards (SLP) 22 are: (1) the frame of dirty data 48 that is being transferred to card 22 and one of the held dirty data RAMs 21; (2) the frame of dirty data that is being processed by cards 22; and (3) the processed image frame that is being forwarded from scan line processor cards 22 to masking multiplier 52. As a further aid to understanding the interaction among the input RAMs, the held dirty data RAMs and the result RAMs consider the following image processing sequence:

age, the noise or aberrations caused by the imperfect antenna.

The dirty beam pattern preferably is determined empirically. A "phantom" target comprised of tissue-simulating material having various point source objects and shaped objects buried in the tissue-simulating material can be illuminated using the particular transducer array A which will gather data. The image produced by transducer array A of the phantom point source is the "dirty beam pattern." Such images, however, will contain considerable noise and the "point sources" in the phantom are not theoretical point sources. Accordingly, the images intensity values may typically be averaged.

A point source, for example, will be seen or appear as the brightest point on 3 or 4 adjacent raster scan lines or pixel rows. The pixel intensity values along the row in

| F# | In/Out Input Ram 44 | In/Out Input Ram 46 | In/Out Held Dirty Ram 21a | In/Out Held Dirty Ram 21b | In/Out Held Dirty Ram 21c | In SLP 22 | Process SLP 22 | Out SLP 22 | In/Out Results Ram 45 | In/Out Results Ram 47 |
|---|---|---|---|---|---|---|---|---|---|---|
| 0 | 0i | | | | | | | | | |
| 1 | 0o | 1i | 0i | | | 0i | | | | |
| 2 | 0o | 2i | 0i | | | 0i | | | | |
| 3 | 3i | | 2o | | 2i | | 2i | 0p | | |
| 4 | 4i | | 2o | | 2i | | 2i | 0p | | |
| 5 | 4o | 5i | | 0m | | 4i | 4i | 2p | 0o | 0i |
| 6 | 4o | 6i | | 0m | | 4i | 4i | 2p | 0o | 0i |
| 7 | 7i | | 6o | 6i | 2m | | 6i | 4p | 2o | 0o | 2i |
| 8 | 8i | | 6o | 6i | 2m | | 6i | 4p | 2o | 0o | 2i |
| 9 | 8o | 9i | | 8i | 4m | | 8i | 6p | 4o | 4i | 2o |
| 10 | 8o | 10i | | 8i | 4m | | 8i | 6p | 4o | 4i | 2o |
| 11 | 11i | | 10o | 6m | | 10i | 10i | 8p | 6o | 4o | 6i |
| etc | | | | | | | | | | | where:
i = refers to into a memory or SLPs
m = refers to masking dirty data out from RAM assembly 21 for masking multiplication
o = refers to out from a memory or SLPs
p = refers to processing in SLPs It can be seen that frame number (F#) 0 dirty data must be held for 3 image processing times (6 frame times) so that it can be multiplied at masking multiplier 52 by its corresponding clean image data 50 when that data is emitted from the scan line processor cards. Also of interest note that every other incoming frame to the input RAMs 44 and 46 is overwritten and every frame is presented twice for display by the result RAMs.

The last data item transferred to SLP card 22 for each image row of pixels is the "clean limit." The clean limit is the threshold below which CLEAN, or beam subtraction, will not proceed. The clean limit is useful to set the noise floor for image processing and necessary to prevent the CLEAN algorithm from returning negative value pixels. The clean limit is set by the operator via operator interface 12 and multiplexed out to SLP card 22.

Two "beams" are used in the CLEAN process: a "dirty beam" and a "clean beam." The dirty beam is a numerical representation of the signal values of the transducer/antenna array directional pattern. Its "elements" are the directional sensitivities ratioed to the most sensitive antenna directional angle. In the preferred embodiment the antenna beam pattern is segmented into forty-seven directional elements centered on the most sensitive element. A perfect antenna would have a central element value of 1.0 and all other element values would be 0.0. A real antenna has non zero element values, adjacent to the central element, which cause image smear or blurring. The dirty beam is used by the CLEAN algorithm to deconvolve from the imthe same X or Θ positions on up to twenty three pixels on both sides of the brightest point can be averaged. These averaged values can be used as the dirty beam pattern, but experience indicates that such a dirty beam pattern will typically be too wide proximate the brightest point. Thus, the dirty beam pattern can be narrowed by reducing the intensities of beam elements proximate the brightest point on an approximation learned by experience to produce good results, or by fitting to an exponential curve approach is based upon the use of a log-based amplification in the echographic imaging apparatus and the intensity data values are reduced by conversion to exponential values before averaging.

In this area there is a certain amount of subjectiveness as to establishing the precise values of the dirty beam pattern components, but such empirical averaging and narrowing will produce a dirty beam pattern which is reasonably accurate and will result in considerable image enhancement and noise reduction. Phantoms suitable for determination of such "dirty beam pattern" component values can be commercially obtained, for example, using the phantom product of Radiation Measurements Incorporated, as described in U.S. Pat. No. 4,277,367.

As will be set forth in more detail below, it is preferable that the entire value of the dirty beam components not be subtracted during each processing iteration. Instead, only a percentage of the dirty beam pattern component values are removed, which percentage is referred to herein as the "clean gain." The actual values of the dirty beam elements preferably are scaled or reduced by the clean gain before they are written to the beam memory. This eliminates the need to perform a scaling operation during image processing time.

The result of the dirty beam deconvolution (called herein the "dirty subtract" phase) is a data set called the "clean components." The clean components are pixel positions and intensities that the CLEAN algorithm has identified as significant image features. The clean components form an image which is a deblurred version of the original dirty image.

The clean component image can be displayed, but it is sparse compared to the original dirty image and presents a grainy or artificial appearance. A "clean beam," therefore, preferably is used to improve the appearance of the final image. The last step of the CLEAN algorithm, therefore, preferably is to convolve clean beam elements with the clean component data set (called herein the "clean add" phase). As used herein, however, the expression "clean image signal" shall also include a signal which is only the clean components signal, as well as a clean signal having the clean beam convolved into the signal to smooth the image.

The final display of the noise-reduced image is strongly influenced by the choice of the clean beam. The clean beam, like the dirty beam, consists of a number of elements centered on a unity valued element. If the clean beam elements are chosen to be equal to the dirty beam elements then the final clean image will be indistinguishable from the dirty image. If the clean beam is chosen to have a unity valued central element, and all other elements zero, then the clean image will be indistinguishable from the clean components image. Actual choice of the clean beam is determined by viewing the processed image and selecting an element pattern for the clean beam that presents a pleasing image. Such a selection can be made by an operator through operator interface 12 and again is somewhat subjective.

In practice it has been empirically found that a relatively narrow clean beam pattern will provide the desired image smoothing. Thus, if the central element has a value of 1.0, the pixels on either side may have values of 0.8, while the next two pixels have values of 0.1 or 0.2. The remaining possible clean beam elements are set at zero. Such a clean beam pattern, therefore, is comprised of only 5 elements centered about a central pixel value of 1.0. This clean beam will produce smoothing of the clean components data when the clean beam elements are convolved back into the clean components.

Returning now to the signal data transfer, processor assembly 22 receives dirty data 48 from input RAMs 44 and 46, and sends that data to individual scan line processors 100 (FIG. 6) in assembly 22, where the dirty data is cleaned by implementing a one dimensional CLEAN algorithm. The pixel intensity spectrum resulting from a one-dimensional CLEAN can be expressed as follows:

$$I_{n+1}(x) = I_n(x) - \gamma P(x)\delta(x-x_o)$$

where $I_n(x)$ = Pixel intensity spectrum of n pixels in a row
$I_{n+1}(x)$ = Pixel intensities after one iteration
$\gamma$ = Clean gain
$P(x)$ = Dirty beam pattern
$\delta(x-x_o)$ = Delta function centered at position $x_o$.

Scan line processor assembly 22 receives clean image data back from individual scan line processors, and passes the clean image signals or data to masking multiplier 52. Processor 22 works with data flow control 67 to control individual scan line processor addressing in order that the proper one of a plurality of SLP processor cards 22 transfers data at the proper time. Counters in flow control 67 are configured to reflect the number of pixel rows in an image, the number of individual scan line processors in the system and the number of system clocks necessary to process an image.

The masking multiplier 52 multiplies dirty data 51 held in held dirty data RAM assembly 21 by the corresponding processed or clean image signals 50 to accomplish masking. In the preferred embodiment, masking is accomplished by multiplying dirty image signal intensity data 51 by the clean image signal intensity data 50 on a pixel-by-pixel basis. It should be noted that the masking step can be bypassed under operator control via the operator interface 12. The masking theory involved in reducing or removing image processing artifacts is set forth in detail in Related application Ser. No. 07/815,509 and will not be repeated here.

Multiplier 52 outputs clean and masked data 54, which is input to a compression RAM 56, where the intensity of clean and masked data 54 may be scaled or compressed. Scaling of the pixel intensity data is useful to optimize the image contrast for viewing. The intensity profile for the clean compression RAM 56 can be controlled and selected by the operator via the operator interface 12, and can include contrast enhancing algorithms such as raising the intensity to 0.6 root of its value and multiplying that result times a factor, such as 1.2 or 1.3.

The clean, masked and compressed data 58 is input into one of result RAMs 45 and 47, which stores clean image signals 58. In the preferred embodiment, two 256K × 8 bit RAMs are employed.

Transfer counter 62 and rotation PROM 64 control the transfer of the masked and compressed clean image signals 58 into results RAMs 45, 47 such that signals 58, which are X,Y coordinate data, are transferred back to a raster scan or r,Θ coordinate system. Result RAMs 45 and 47, therefore, output processed image data or clean image signals 26, which are clean, masked, compressed and rotated, into ultrasound instrument 20 and into VGA card 16 for display.

Referring now to FIGS. 5, 5-1 and 5-2, a scan line processor assembly interface 70 is shown. The scan line processor assembly 22 is comprised of at least one scan line processor board (not shown) having a scan line processor assembly interface 70 and at least one scan line processor (SLP) 100 (FIG. 6). Interface 70 controls the operation of each of SLPs 100 on the board. In the preferred embodiment, each scan line processor board has sixteen SLPs 100 and, hence, the interface 70 controls those sixteen SLPs 100. In the preferred embodiment, the scan line processor assembly 22 includes thirteen scan line processor boards, such that the entire processor assembly 22 employs 208 individual SLPs 100. Each SLP 100 is able to process one row of dirty data 48 (approximately 512 pixels) in one 1/30 of a second. Hence, 208 SLPs 100 will be able to process 208 image rows in 1/30 of a second and 416 image rows (one complete image) in 1/15 of a second. Data flow control 67 and processor assembly 22 are programmed to reflect the number of individual SLPs 100 in scan line processor assembly 22.

Interface 70 includes a beam memory and a data transfer sequencing assembly, generally designated 49, which receives the system clock, processing status signals from other parts of interface 70 and control signals from operator interface 12. The purpose of interface 70 is to control the addressing of a beam element memory 71 (which in the preferred embodiment is a 128×16 bit RAM), to buffer data transfer between individual SLPs 100 and SLP assembly 22, to provide zero data to initialize portions of individual SLP 100 memory 78 (FIG. 6) and to provide beam element intensity data to the SLP multipliers 80 (FIG. 6).

In the preferred embodiment, sequencing assembly 49 is comprised of a programmable logic sequencer 51, a preloadable counter 53 and tri-state buffers 57a, 57b, 57c and 57d. Operator interface 12 signals to sequencer 51 when the operator has requested to load new, clean gain or beam data into beam memory 71. Sequencer 51 then sets beam address counter 53 to zero and configures the data path buffers 57a and 57c to pass beam data from the SLP processor assembly 22 to beam memory 71. Operator interface 12 presents beam data elements, one by one, to SLP processor 22 and then signals to sequencer 51 when each new element is placed. Sequencer 51 writes that data into beam memory 71 and advances the beam address counter 53.

FIG. 5A shows a typical beam memory diagram for memory device 71. The clean gain, for example, 0.3, is written by the operator into memory address 0. Up to 47 dirty beam elements are written into memory addresses 1-64, based upon an empirical determination of these component values using the phantom. If there are 47 elements in the dirty beam the unity or 1.0 element can be written at address 24 and the remaining elements written at addresses corresponding to their location on the scan line from the brightest or unity point. Usually, the dirty beam element values will fall to zero less than 23 pixels away from the bright point. Finally, addresses 64 to 128 can be used for the clean beam component values, typically only a small number of clean beam components (e.g., 5 or 7) will be used.

In the preferred embodiment, sequencer 51 is programmed to write the clean gain and up to forty-seven dirty beam elements into the first 48 locations of beam memory 71, load the address counter 53 to point to memory location 64, and then write up to forty-seven clean beam elements into beam memory locations 64 through 110.

The CLEAN processing of dirty image data 48 requires a fixed and precise number of system clock cycles. The start of an image frame processing sequence is based upon a "begin" signal 83 which is generated by the data flow control device 67 in signal interface 18. Begin signal 83 initializes counters and sequencers in interface 70 and individual SLPs 100 which, thereafter, control the CLEAN processing operations until such time as an image frame has been processed. The timing of the system is tuned such that CLEAN processing is completed in a minimum amount of time before the next begin signal 83 arrives from signal interface 18.

During image data processing, when a particular scan line processor interface card 70 is active for data transfer, sequencing assembly 49 (under control of sequencer 51) passes clean processed data 50 that was processed during the previous image processing time from individual SLPs 100, via a scan line transfer data bus 59 and 61 and buffer 57b, to signal interface 18. Sequencer assembly 49 then places zero, by means of buffer 57d, on the bus 59 and bus 61 for 2 clock periods to initialize the SLP clean component segment of memory 78 and clean image segment for the next image processing time. Sequencing assembly 49 finally places dirty image data 48 from signal interface 18 on data bus 59 via buffer 57a for SLPs 100 to process during the next image processing time.

During image data processing time, irrespective of data transfer that may be in progress, sequencing assembly 49 (under control of sequencer 51) manipulates beam memory 71 address in order to place the clean gain, dirty beam elements and clean beam elements on the beam element/clean gain bus 108 at the proper times. Other logic in interface 70 signals sequencing assembly 49 when it is time to begin placing clean gain followed by dirty beam elements on bus 108 and when to begin placing clean beam elements on bus 108. Sequencing assembly 49 is programmed to reflect the number of elements in the beams so the signals required for its operation include when to start and which beam set to send.

Scan line processor assembly interface 70 also receives from signal interface card 18 an upper scan line row address signal 55 and a lower scan line row address signal 63, which are generated in flow control device 67. Lower scan line row address signal 63 is the lower four bits of a counter that counts pixel rows as the dirty pixel data 48 are sent by the signal interface 18 to interface 70. These lower four bits 63 select one of 16 SLPs 100, by means of transfer row select decoder 38 on the SLP board, which may be enabled for data transfer. Upper scan line row address 55 is the upper four bits of the same counter. Upper address 55 is compared to the local board address 85 by a board select comparator 36 to select the particular one of the plurality of scan line processor boards to be used.

When the upper address 55 matches the local board address 85, then transfer row select decoder 38 is enabled to send transfer cycle signals 73 to a particular SLP on the circuit board thus initiating the SLP data transfer sequence. Since, in the preferred embodiment, each SLP board includes sixteen SLPs 100, decoder 38 outputs sixteen control signals 73 (XFER CYCLE 0-XFER CYCLE 15) which respectively select one of SLPs 100.

Transfer of dirty data 48 to the selected SLP is a four step per pixel process that occurs simultaneously with image data processing. If an individual SLP 100 is selected for data transfer, the previously processed clean data is sent from the selected SLP, via scan line transfer data bus 59, 61 to signal interface 18. Next, buffer 57d places a zero on data bus 59, 61 for two clock cycles. When the selected SLP 100 receives the zero signals, it initializes the clean component and the clean image segment of its memory.

The new dirty data 48 is placed on data bus 59 at the beginning of the four clock transfer sequence. The data 48 is passed to SLP 100 via bus 59 and buffer/latch 57a at the fourth clock of a transfer sequence. It should be noted that both new dirty data 48 and previously cleaned data 50 are simultaneously active on two busses that connect signal interface section 18 to interface 70. Buffers 57a and 57c are buffer/latches that hold data 48, 50 and allow the SLP processor assembly 22 and SLPs 100 to access the data at convenient times.

A buffer 82 provides for signal distribution to interface 70 section of the SLP circuit board while limiting instrument signal backplane loading. A buffer 77 is used to distribute signals from interface 70 to SLPs 100, while limiting counter and sequencer signal loading.

Typically, all sixteen of the individual SLPs 100 are processing different dirty data simultaneously. Multiplier sequencer 86 sequences all of SLPs 100 on a scan line processor board by generating multiplier control signals 87 that are used by SLP multipliers 80 (FIG. 6). One additional function of interface 70 on each scan line processor board is to reduce the amount of circuitry required by the individual SLPs 100. For example, all SLP multipliers 80 are using the same beam data 108 and the same multiplier control signals 87 at any instant to perform convolutions on differing image row data. When an SLP 100 is selected for data transfer, its multiplier continues to function, but the results are discarded. In the preferred embodiment, there are 600 "find the maximum pixel intensity and dirty subtract" iterations for each image row. Three find and subtract phases are required to transfer pixel data to an SLP, leaving 597 effective iterations.

The "tuning" of the system involves selecting a dirty beam element values, the clean beam element values, and the number of CLEAN iterations performed on an image row. The tuning is implemented by the programming of counters and sequencers. Pixel counter 60 is preprogrammed with the number of clock periods necessary to find the maximum value pixel. The timings provided by pixel counter 60 are illustrated in FIG. 5 at timing signal notation 88. The segment "find max pixel time" represents the time during which SLPs 100 are searching for the maximum value pixel in the Y image row being processed. The segment "dirty subtract time" is determined by convolve time counter 92 and represents the time necessary for dirty beam deconvolution during the dirty subtract phase. A convolution end signal 95 is used by the pixel counter 60 to restart its find max pixel counting and by the iteration counter to count find max pixel/dirty subtract iterations.

In the preferred embodiment, pixel counter 60 counts 511 clock cycles to search for the maximum value pixel; convolve time counter 92 counts 242 clock cycles necessary to deconvolve the dirty beam; and iteration counter 93 counts 600 find max pixel/dirty subtraction iterations before asserting the "clean add time" signal 81. During clean add time, pixel counter 60, convolve time counter 92 and iteration counter 93 are logically arranged as a serial counting chain which counts the total number of clock cycles for the clean add phase. When that number of clock cycles have occurred, clean add time signal 81 falls and the various sequencers and counters that use that signal become idle until the next begin 83 signal arrives.

A "row end" signal 79 is used by the beam memory and data transfer sequencer 49, multiplier sequencer 86 and SLP sequencer 66 (FIG. 6) to determine when dirty beam deconvolution begins. The various sequencers 49, 86 and 66 keep their own accounting of system clocks and so do not use row end signal 79 during the clean add phase. Iteration counter 93 is used to count the number of find/dirty subtract phase iterations to determine when clean add time begins. Clean add time signal 81 from iteration counter 93 informs the various sequencers to switch to the clean add phase of the processing. Timing notation 89 shows the relationship of the clean component build time (composed of a plurality of find max pixel/dirty subtract times) and the clean add time.

Referring now to FIGS. 6, 6-1 and 6-2 a scan line processor circuit 100 is illustrated. As previously discussed, in the preferred embodiment, there are 16 individual SLP circuits 100 per scan line processor board. Since the preferred embodiment of signal processing assembly 10 uses thirteen boards, 208 SLP circuits 100 are employed. In the preferred embodiment, the number of SLPs 100 is preprogrammed into a signal interface 18.

The dirty data 48 is received by the SLP 100 from interface 70 and input to SLP memory 78 via a tri-state buffer 84. Tri-state buffer 84 is either an open circuit or bidirectionally transfers dirty data 48 or processed image data 50 between SLP 100 and interface 70 when SLP 100 is selected for data transfer by signal interface 18 via the lower and upper scan line row adder signals 55 and 63, and interface 70 sections of the scan line processor boards. SLP memory 78 is an 8K×16 bit static RAM that is organized as 2 sides consisting of 4 segments each. One side of the memory is the working side where the CLEAN image processing is taking place. The other side is the transfer and initialization side where the previously cleaned image data and the image data to be processed during the next image frame processing time are stored. The memory sides alternate each image frame by means of a side signal 75 generated by the signal interface section 18. The side signal 75 is common to all SLPs 100 and is used as a high order address bit for SLP memory 78.

During the transfer and initialization time for a particular SLP, the side signal 75 is complemented by logic in a maximum pixel address register 74 under control of the "transfer cycle n" signal 73, such that transfer and initialization occurs in the alternate memory side from the currently working side.

As may be seen in FIG. 6A, memory 78 consists of four memory segments: the DIRTY IMAGE segment where a Y image row of dirty image signals is deconvolved; the CLEAN COMPONENTS segment where the result of dirty image signal deconvolution are accumulated; and the CLEAN IMAGE section where the result of convolution of the clean beam with the clean components is accumulated and stored. The fourth segment is unused. Its size is fixed by the number of pixels in an image row for a particular embodiment. Its function is to make up the difference between the physical memory size and the memory size required by a particular embodiment.

SLP 100 also includes a sequencer 66 which controls the scan line processor, and sequencer 66 receives control signals namely, signal 83 "BEGIN," signal 79 "ROW END," signal 81 "CLEAN ADD TIME," and signal 73 "XFER CYCLE N" from interface 70 and P<Q signal 116 from a latch/compare circuit 94 of SLP 100. In the preferred embodiment, the sequencer is an ALTERA-EPS 448 circuit chip. The XFER CYCLE N signal 73 selects only one SLP 100 at any moment for data transfer by means of the SCAN LINE ROW address signals 63, 55 and logic in interface 70 section of the scan line processor boards. Sequencer 66 is responsible for memory segment addressing, memory write enable, memory and multiplier output enable, and pixel address control. It should be noted that multiplier 80 control signals, except output enable, come from interface 70. The multiplier output enable comes from the local SLP 100 because the multiplier would interfere with data transfer were it centrally controlled.

During data transfer, the data stored in the CLEAN IMAGE segment are clean image signals 50 from the previous image frame. Clean image signal 50 is first sent to interface 70 via the SCAN LINE XFER data bus 59, 61 and then the CLEAN IMAGE segment is initialized to zero. During the transfer and initialization time, the CLEAN COMPONENTS segment is initialized to zero and dirty image signals 48 for the next frame processing time are written into the DIRTY IMAGE segment. Memory Address 0-9 addresses one of the 511 pixels in one of the segments specified by "Address 10" and "Address 11" generated by sequencer 66.

The DIRTY IMAGE segment for each SLP 100 contains one Y image row of X pixels, here 511 pixels of dirty data 48 plus the clean limit in the last location. During CLEAN processing, when the brightest pixel found during the find phase is the clean limit (which is stored in the last memory location), then the signal P<Q signal 116 is true at the start of the dirty subtract phase. Sequencer 66 recognizes this condition and prevents the dirty subtract phase from occurring, thus causing the SLP 100 to honor the clean limit.

The CLEAN algorithm in SLP 100 is implemented in several phases. The first phase is the "find" phase in which the maximum pixel value in the row of dirty image signals is located. The maximum value pixel is considered by the CLEAN algorithm to represent a significant physical feature in the imaging area. Moreover, the CLEAN algorithm assumes that the return signal caused by this feature, by interaction with the transducer beam pattern, has affected nearby image pixels adversely.

Latch circuits 94, 96 and 98 together perform a dirty pixel comparison to find the maximum pixel value in one row of dirty image signals. In the preferred embodiment, the upper eight bits of the intensity value of dirty pixel signals stored in SLP memory 78 are compared. Circuits 94, 96, and 98 compare each dirty pixel to the previously found maximum pixel intensity. When a new maximum pixel intensity is detected, the new value is latched into a temporary max latch circuit 98. Specifically, the dirty image pixel data to be compared is output from SLP memory 78 and latched into a temporary latch 96. This signal also is output as pixel signal 112 to a maximum pixel detector 94, along with the previously found maximum pixel signal 114, which is output from temporary max latch circuit 98.

The previous found maximum pixel signal 114 is input to port P, and the pixel signal 112 is input to port Q. When P<Q becomes true the maximum pixel detector 94 has detected a new maximum pixel. The maximum pixel detector 94 outputs a P<Q signal 116 which is input to sequencer 66 and maximum pixel address register 74. Sequencer 66 uses signal 116 to recognize when the last pixel in the row is detected as the maximum valued pixel. The last pixel is the clean limit and thus is not deconvolved. Address register 74 uses signal 116 to generate a latch max signal 118. Signal 118 causes the value of the maximum found pixel to be latched into temporary maximum latch register 98, and the address of the pixel to be latched into convolve address register 72 and max pixel address register 74.

Image data preferably are transferred to and from the SLPs as 8 bit pixel intensity values and the compare operation to find the maximum value pixel is also an 8 bit operation. The convolutions preferably are performed as 16 bit scaled integer operations and memory width is 16 bits in order to maximize precision.

The next phase of implementing the CLEAN algorithm is the "dirty subtract" phase in which a one-dimensional transducer array beam pattern (the X intensity pattern for the Y row being processed) is deconvolved or subtracted out of the image in the vicinity of the maximum found pixel. The dirty beam pattern deconvolution is performed by multiplying the intensity value of the found maximum pixel by each of the beam element values and thereafter subtracting the resulting products from the dirty pixel intensity values in an X direction along the Y row in the vicinity of and including the maximum found pixel.

The multiplications and subtractions are performed in the scan line processors in the following manner:

(1) The maximum found pixel intensity value is placed in the Y register of multiplier 80.

(2) Clean gain 108 is placed in the X register of multiplier 80 by interface 70.

(3) The intensity value of the clean component at the location along the row being processed of the found maximum pixel position is placed in the preload (PL) register of multiplier 80. This clean component value will be found in CLEAN COMPONENT segment of memory 78 (FIG. 6A) and will be zero for the first iteration because no prior clean component values will be stored in memory 78. For later iterations of closely adjacent locations, there will be a stored clean component value.

(4) Multiplier 80 is clocked for a multiply/add operation causing the intensity value of the maximum found pixel to be multiplied by the clean gain (for example, 0.30) and added to any preexisting clean component value in memory 78.

(5) The updated or new clean component value is written back into SLP memory 78 in the CLEAN COMPONENT segment.

(6) The beam element number n is initialized to zero.

(7) A first of n dirty beam element intensity values is clocked into the X register of multiplier 80 by interface 70.

(8) A first dirty image signal or pixel intensity value having the address m is loaded into the preload register of multiplier 80, where m =MPA−(BW−1)/2+n and MPA is the maximum pixel address of the found maximum pixel, BW is the beam width or number of elements in the dirty beam and n is the specific beam element being subtracted beginning with zero.

(9) Multiplier 80 is clocked for a multiply/subtract operation, causing the maximum pixel value to be multiplied by the intensity value of the $n^{th}$ beam element and the resulting product to be subtracted from the intensity value of the dirty pixel address m. Note, that all the intensity values of the dirty beam elements have previously been scaled by the clean gain (e.g., 0.30).

(10) If the result is positive, as determined by the absence of minus signal 99 from multiplier 80, then the updated dirty pixel value at the m address is placed into DIRTY IMAGE segment of memory 78. If the result is negative, then the memory write operation is inhibited by the minus signal 99, which is input from multiplier 80 to pixel address control and counter 68. It should be noted that minus signal 99 is the most significant bit of multiplier result register and the multiply/subtract operation is a twos complement operation.

(11) Operations 7 through 10 are repeated over the X width of the dirty beam on the row being processed to thereby remove a percentage (the gain) of the dirty beam pattern from the dirty image signals around and including the found maximum pixel value.

(12) The find and dirty subtract phases are repeated for a number of times, as determined by the iteration counter 93, which is 600 less 3 for data transfer in the preferred embodiment.

As will be seen, therefore, the one-dimensional CLEAN algorithm first finds the maximum dirty image signal value and location. It then stores, as a clean component, that value times a clean gain percentage. Next, it subtracts the scaled or gain-reduced dirty beam pattern values from the dirty image signal values along the row at locations determined by the location of the found maximum dirty image signal value.

The final phase of CLEAN processing is the clean add phase wherein the clean beam is convolved with the clean components to form the clean image. The clean components for the new pixel intensity spectrum given by the expression:

$$I_n(x) = \sum_{m=1}^{Z} CB(x)A'(x_o)\delta'(x - x_o)$$

where,

CB(x) is the clean beam pattern, and $A'(x_o)\delta'(x-x_o)$ is a clean component.

The sequencer 66 is signaled by means of the clean add time signal 81 when it is time to begin the clean add phase. The sequencer 66 examines that signal 81 at the end of each dirty subtract phase to determine if another "find/dirty subtract" operation is to be performed or if the "clean add" operation is to begin.

The clean add operation consists of convolving the clean beam pattern with each of the clean components in memory 78 for the image row being processed. The clean beam pattern convolution is performed by multiplying the value of the clean component by each of the clean beam element values and adding the products to clean image pixels stored in memory 78 at locations or address determined by the address of the clean component into which the clean beam is being convolved.

The multiplications and additions are performed in the scan line processors in the following manner:

(1) A clean component pixel intensity value from CLEAN COMPONENTS segment of memory 78 is placed in the Y register of multiplier 80.

(2) The beam element number n is initialized to zero.

(3) The clean beam element n is clocked into the X register of multiplier 80 by interface 70.

(4) A pre-existing clean image pixel value at the address or location m is loaded from CLEAN IMAGE segment of memory 78 into the multiplier preload register. For the first convolution all the CLEAN IMAGE segments will have zero values. The address m=ACC−(BW−1)/2+n where ACC is the address of the clean component, BW is the clean beam width in number of beam components and n is the specific clean beam element being processed (beginning with zero).

(5) Multiplier 80 is clocked for a multiply/add operation, causing the clean component pixel value to be multiplied by the clean beam element value and added to any pre-existing clean image pixel at address m.

(6) The updated clean image pixel value is replaced in the CLEAN IMAGE segment of memory 78.

(7) Operations 3 through 6 are repeated over the width or X dimension of the clean beam in the Y row being processed.

(8) The next clean component pixel in the image row is retrieved from CLEAN COMPONENTS segment of memory 78 and placed into the Y register of multiplier 80 and operations 2 through 7 are repeated over the width of the image row.

Thus, each clean component in memory 78 is convolved with the clean beam pattern in memory 71 to produce a smoothed set of clean image signals stored in CLEAN IMAGE segment of memory 78.

When transfer cycle n signal 73 is true, for an SLP at the beginning of a find phase, then the SLP goes into the data transfer and initialization mode for three find/dirty subtract iteration times. During the find phase sequencer 66, pixel address and control counter 68 and memory address buffer and counter 76 work together to address the pixel data in memory 78. Counter 68 is initialized to zero at the start of each find maximum pixel phase and thereafter is incremented by sequencer 66 in order to examine each dirty pixel in the image row sequentially. Memory address buffer and counter 76 holds the dirty pixel address as part of the pipeline.

Referring now to FIG. 7, the find maximum dirty pixel operation can be seen to be a "pipelined" operation in that several otherwise sequential operations are performed concurrently during the same system clock cycle. Counter 68 is incremented at each system clock to generate pixel address n. That address n is latched into buffer/counter 76 at the next system clock such that buffer 76 contains the previous counter 68 count. Memory 78 emits dirty pixel data for the address in buffer/counter 76, which is latched into latch 96 at the next system clock. Thus, there have been two system clocks between the time address n was generated by counter 68 and the data for address n are tested for maximum at the output of latch 96.

If the tested dirty pixel intensity data value is greater than the previous maximum, then a P<Q signal 116 causes the current address from the counter 68 to be adjusted and latched into convolve address register 72 and maximum pixel address register 74. It should be noted that counter 68 has advanced twice between the time address n was generated and the data for address n are tested. Therefore, maximum pixel address register 74 is a subtracter as well as a register. The maximum pixel address latched is the current pixel address 106 minus the pipeline depth which here is two. Convolve address register 72 latches the address at which dirty beam deconvolution is to begin based upon the address of the maximum found pixel. Therefore, convolve address register 72 is a subtracter as well as a latch. The convolve address latched is counter 68 count minus (BW−1)/2—the pipeline depth (where BW is the dirty/clean beam width, i.e., number of beam elements).

During the dirty subtract phase, sequencer 66, maximum pixel address register 74, convolve address register 72 and buffer/counter 76 work together to address the data in memory 78. First, a max pixel address 102 is latched into buffer/counter 76, which causes memory 78 to emit the value of the maximum found pixel which is latched into the Y register of multiplier 80. Sequencer 66 then selects the CLEAN COMPONENT segment of the memory and the current clean component value is latched into the multiplier preload register. The maximum found pixel is multiplied by the clean gain provided by interface 70, and added to the current clean component. The updated clean component is then replaced in memory 78. Next a convolve address 104 is latched into buffer/counter 76 and sequencer 66 selects the DIRTY IMAGE segment of memory 78. During dirty beam deconvolution, as discussed above, dirty pixel addressing is accomplished by the counting function of buffer/counter 76.

During the clean add phase sequencer 66, pixel address counter 68, convolve address register 72 and buffer/counter 76 work together to address data in memory 78. At the start of the clean add phase, counter 68 is cleared and clocked into both convolve address register 72 and buffer/counter 76. Sequencer 66 selects the CLEAN IMAGE segment of memory. The first clean image pixel (initialized to zero during the transfer and initialization procedure) is loaded into the preload register of multiplier 80, thus initializing that register. Sequencer 66 next selects the CLEAN COMPONENT segment of memory and convolve address 72 is transferred to buffer/counter 76. Thus, the first clean component to convolve with the clean beam as discussed above is selected. Addressing for the clean component pixels is accomplished by the counting function of buffer/counter 76. When a clean component/clean beam convolution is complete the address in counter 68 is clocked into buffer/counter 76 and sequencer 66 selects the CLEAN IMAGE segment of memory 78. The result of the convolution in the multiplier is then written to memory 78 as a completed clean image pixel. Counter 68 is then incremented to point to the next clean pixel, and the process repeated until the entire clean image row is completed.

It should be noted that pixel addresses outside of the image row pixel address space will be generated when convolutions are performed near the ends of the row. Signals MA512 and CA512 serve to prevent out of range addresses from being included in convolutions. CA512 is the most significant bit of the 10 bit convolve address register 72. The subtraction performed in convolve address register 72 is a twos complement operation. Whenever the result of that subtraction is negative the CA512 signal will be true.

For example, when convolve address register 72 specifies that the convolution is to begin at address −1, the address emitted from the convolve address register 72 is 3FF in hexadecimal. The buffer/counter 76 loads only the lower 9 bits of convolve address register 72 so its contents will be 1FF in hexadecimal. Multiplier sequencer 86 in interface 70 and logic in counter 68 examine MA512 and CA512 for equality to enable convolution and memory write operations. In the case above, the MA152 and CA512 signals are unequal so address −1 is not included in the convolution.

Buffer/counter 76 counts with 10 bit precision so after it is incremented during the convolution step (once in the above example), it will pass through address 200 hexadecimal. At such time MA512 and CA512 will both be equal to 1 and the convolution will be enabled. At the other end of the row when the convolution start address is high, 1FF hexadecimal, for example, then both MA512 and CA512 will be zero at the first convolution step so that location will be included in the convolution. Prior to the next convolution step buffer/counter 76 will be incremented causing its address to become 200 hexadecimal. Now MA512 and CA152 are different so convolution is inhibited.

Note that for clean beam convolution, multiplier sequencer 86 suppresses the convolution operation and during dirty beam deconvolution, counter 68 inhibits writes to memory outside of the dirty image pixel address space. In addition, during the dirty subtract operation, minus numbers must not be written into the dirty image segment of memory. Counter 68 uses a minus signal 99 as a write inhibit means.

Memory address buffer and counter 76 has a dual function. It either serves a buffer during the find phase and merely passes the address signals 102, 104, 106 through to the SLP memory 78, or, during the convolve phase (dirty subtract and clean add), it is a preloadable counter. As a preloadable counter, it generates sequential addresses originating at the first convolve address as loaded from the convolve address register 72. The counter 76 receives a "maload" signal and a "macount" signal from sequencer 66, which control whether counter 76 is acting as a buffer or a preloadable counter.

In summary, the sequence of operations for processing an image row are as follows:
1. Idle before begin signal 83, initialize the find phase by zeroing counter 68, loading counter to buffer/counter 76, latch memory 78 contents (dirty pixel for address 0) into latch 96, latch the contents of register 96 into register 98.
2. Find the maximum value pixel in the row by incrementing counter 68, load counter 68 into buffer/counter 76, latch memory 78 contents (dirty pixels for the row) into latch 96, if latch 96 value is greater than the value in latch 98 as determined by latch 94, then latch the contents of latch 96 into register or latch 98, repeat over the X dimension width of the image row, as determined by row end signal 79.
3. If the P<Q signal 116 is true, then do nothing for the number of clock counts necessary to perform the clean component addition and dirty subtract phases before returning to step 1 above. If the signal P<Q is false, then load the max pixel address 102 into buffer/counter 76, select the CLEAN IMAGE memory segment with sequencer 66, latch memory 78 contents (clean pixel at maximum pixel location) into the preload register of multiplier 80 to initialize the upper portion of that register (recall that the CLEAN IMAGE segment was initialized to zero during the data transfer and initialization procedure and that it remains zero until the clean add phase), select the CLEAN COMPONENT segment of memory, and latch the clean component at the maximum found pixel location into the multiplier preload register lower part, select DIRTY IMAGE segment and latch the dirty pixel at the maximum pixel location into the Y register of multiplier 80, sequencing assembly 49 and multiplier sequencer 86 latch the clean gain into the X register of multiplier 80, multiplier sequencer 86 clocks the multiplier for a multiply/add operation, and sequencer 66 selects the CLEAN COMPONENT segment of memory and writes the updated clean component back into memory over its previous value. Thus the clean components are built as the find/dirty subtract iterations are performed.
4. If the signal P<Q tested false as in step 3 above, then convolve address 104 is loaded into buffer/counter 76 and processing continues below.
5. The CLEAN IMAGE segment of memory is selected and the clean pixel at the convolve address in buffer/counter 76 is latched into the preload register of multiplier 80 to initialize the upper portion of that register, the DIRTY IMAGE segment is selected and the dirty pixel at the convolve address is latched into the multiplier preload register lower part, sequencing assembly 49 and multiplier sequencer 86 latch a dirty beam element into the X register of multiplier 80, the maximum value dirty pixel remains in the multiplier Y register from step 3 above, multiplier sequencer 86 clocks multiplier for a multiply/subtract operation, sequencer 66 writes the updated dirty pixel value back into memory over its previous value, unless the write operation is inhibited by minus signal 99 from multiplier 80, buffer/counter 76 is incremented to point to the next convolve address and the operation is repeated over the width of the dirty beam. Thus, dirty beam deconvolution is accomplished.

6. Initialize for a find phase as in step 1 above, continue processing with step 2 above until clean add time signal 81 is true (600 iterations in the preferred embodiment). When the clean add time signal becomes true, continue with step 7 below.

7. Zero counter 68.

8. Transfer counter 68 to buffer/counter 76 and to convolve address register 72, select CLEAN IMAGE memory segment, load clean image pixel at buffer/counter specified address into the multiply preload register to initialize to zero, transfer convolve address register 72 buffer/counter 76. Thus, SLP 100 is initialized for clean beam convolution with a single clean component.

9. Select CLEAN COMPONENT segment of memory and load clean component into the Y register of multiplier 80, interface 70 loads clean beam element into the X register of multiplier 80, multiplier 80 is clocked for a multiply/add operation, buffer/counter is incremented to point to the next clean component, beam element memory 71 emits the next clean beam element, step 9 is repeated over the width of the clean beam.

10. Select CLEAN IMAGE segment of memory, transfer counter 68 to buffer/counter 76, write convolution result from multiplier result register to clean image pixel as a clean processed pixel, increment counter 68 to point to next clean image pixel, and repeat steps 8–10 over the width or X dimension of the image row, clean add phase end is signaled by lowering of clean add time signal 81. Thus, clean beam convolution is accomplished.

11. Go to step 1 above and wait for processing to begin for the next image field time.

As above described, the clean image signals resulting from the deconvolution-convolution process can thereafter be masked to remove processing artifacts. As also described, the clean image signals are formed into image frames and then forwarded for display.

Having thus described the invention, it is recognized that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof within the scope of the invention.

What is claimed is:

1. An apparatus for the reduction of noise components from an echographic image frame formed from a plurality of adjacent image signal rows each having a plurality of side-by-side image signals therein, said apparatus comprising:

a plurality of scan line processor circuits each connected to said echographic imaging apparatus for receipt and parallel processing of a row of said image signals therefrom, each of said scan line processor circuits further being responsive to receipt of a row of said image signals to produce a row of noise-reduced image signals by deconvolving noise components from said image signals only along said row; and an image frame formation means connected to each of said scan line processor circuits for receipt of noise-reduced image signals therefrom and for arrangement of rows of said noise-reduced image signals in an image frame for display, said image frame formation means being formed for connection to an image display device.

2. The apparatus as defined in claim 1 wherein, said apparatus is formed for processing image signals in the form of at least one of amplitude signals and phase signals.

3. The apparatus as defined in claim 2 wherein, said apparatus is formed for processing of ultrasonic echographic image signals.

4. The apparatus as defined in claim 1 wherein, said scan line processor circuits each deconvolve said noise components from image signals in each row based upon processing of said signals using a one-dimensional CLEAN algorithm.

5. The apparatus as defined in claim 1 wherein, said scan line processor circuits are each formed to subtract signal intensity values of a plurality of elements of a one-dimensional dirty beam pattern from a plurality of image signals along said row at a location determined by the location of a maximum intensity image signal in said row.

6. The apparatus as defined in claim 5 wherein, said scan line processor circuits are formed to scale the values of said plurality of elements of said dirty beam pattern prior to subtraction from said image signals.

7. The apparatus as defined in claim 5 wherein, said scan line processor circuits are each further formed to add signal intensity values of a plurality of elements of a one-dimensional clean beam pattern, having signal intensity values differing from said dirty beam pattern, to clean component image signals from said row about all clean component image signals along said row.

8. The apparatus as defined in claim 1, and a masking multiplier device connected for receipt of image signals from said echographic imaging apparatus and connected for receipt of noise-reduced image signals from said scan line processor circuits, said masking circuit being formed to multiply each of said image signals in said row times the corresponding one of said noise-reduced image signals in said row to produce a row of masked and noise-reduced image signals, said masking circuit further being connected to output said row of masked and noise-reduced image signals to said frame formation means.

9. The apparatus as defined in claim 8, and a scaling circuit connected to said masking multiplier device for receipt of masked and noise-reduced image signals and for scaling all of the values of said masked and noise-reduced image signals in said row prior to output to said image frame formation means.

10. The apparatus as defined in claim 9 wherein, said scaling circuit is connected to user input means for selection of the amount of scaling of the values of said masked and noise-reduced image signals.

11. The apparatus as defined in claim 1, and a display device connected to receive noise-reduced image signals from said image frame formation means.

12. The apparatus as defined in claim 1 wherein, said apparatus includes a sufficient number of scan line processor circuits relative to the number of rows of signals per image frame produced by said echographic imaging device to produce at least about 15 image frames of noise-reduced signals per second.

13. The apparatus as defined in claim 1, and operator input device connected to enable input to said scan line processor circuits to vary the intensity values of said noise-reduced image signals produced thereby.

14. The apparatus as defined in claim 1, and a coordinate transformation circuit connected between said echographic imaging apparatus and said scan line processor circuits and responsive to receipt of image signals in polar coordinates from said interface circuit to transform said image signals into Cartesian-like coordinates for communication to said scan line processor circuits.

15. The apparatus as defined in claim 14 wherein, said coordinate transformation circuit is further connected to transform noise-reduced image signals from Cartesian-like coordinates to polar-like coordinates in advance of display of said noise-reduced image signals.

16. An imaging apparatus for real-time display of noise-reduced echographic images comprising:
an echographic imaging apparatus including an array of a plurality of transducers, signal generating means connected to drive said transducers for transmission of signals thereby, signal processing means connected to receive echo signals from said transducers and responsive to said echo signals to produce successive image frames at a real-time frame rate, each of said image frames being formed by a plurality of correlated dirty image signals with at least some of said dirty image signals including a noise component, said dirty image signals being arranged in a plurality of adjacent rows of signals with each of said rows of signals including a plurality of side-by-side dirty image signals;
a noise-reduction apparatus connected to said echographic imaging apparatus for receipt of said dirty image signals therefrom, said noise-reduction apparatus including a plurality of scan line processor circuits each connected to receive a row of signals and each deconvolving at least a portion of said noise component from at least some of said dirty image signals to produce a row of noise-reduced clean image signals, said scan line processor circuits being connected for parallel processing of said rows of signals and being sufficient in number to deconvolve noise from all rows of signals forming said image frame at a real-time frame rate; and
image display means connected to said noise-reduction apparatus for receipt of clean image signals therefrom, said image display means being responsive to receipt of clean image signals to display said clean image signals in image frames at a real-time frame rate.

17. The apparatus as defined in claim 16 wherein, said echographic imaging apparatus produces dirty image signals including at least one of amplitude signals and phase signals.

18. The apparatus as defined in claim 16 wherein, said scan line processor circuits are responsive to receipt of said dirty image signals to deconvolve a portion of said noise component by a side lobe subtraction process using a one-dimensional CLEAN algorithm limited to noise reduction along the row of dirty signals being processed by each scan line processor circuit.

19. The apparatus as defined in claim 16 wherein, said scan line processor circuits are each formed to perform the following signal processing steps to deconvolve said noise component values:
a. find a maximum value dirty image signal in row of signals;
b. store a clean components intensity value for said maximum value dirty image signal; and
c. thereafter subtract a dirty beam pattern of signal values for said array from dirty image signals having locations determined by the location of the found maximum value dirty image signal along said row of signals.

20. The apparatus as defined in claim 19 wherein, said noise-reduction apparatus includes user input means connected to enable user input of a clean gain scaling factor; and
said noise reduction apparatus is responsive to input of said clean gain scaling factor to scale the intensity values of said dirty beam pattern and said clean component intensity value.

21. The apparatus as defined in claim 20 wherein, said echographic imaging apparatus produces at least about 300 rows of signals and produces a complete image frame at a rate of at least 15 image frames per second, and
said noise-reduction apparatus includes at least as many scan line processors as there are rows of signals produced by said echographic imaging apparatus multiplied by a ratio of the number of processed image frames per second produced by said noise-reduction apparatus divided by the number of image frames produced by said echographic imaging apparatus.

22. The apparatus as defined in claim 21 wherein, said echographic imaging apparatus produces about 416 rows of signals at 30 imaging frames per second, and
said noise-reduction apparatus include 208 scan line processor apparatus formed to deconvolve noise components in said row of signals at a rate of 30 rows per second.

23. The apparatus as defined in claim 19 wherein, said scan line processor circuits perform the iteration of, after each said subtract step, finding a next maximum value dirty image signal in said row of signals, storing a clean component intensity value for said maximum value image signal, and thereafter subtracting said dirty beam pattern of signal values from image signals having locations determined by the location of each maximum found maximum dirty image signals until a clean limit has been reached.

24. The apparatus as defined in claim 23 wherein, said noise-reduction apparatus includes user input means connected to enable user input as to said clean limit.

25. The apparatus as defined in claim 23 wherein, said scan line processor circuits are each formed to convolve a clean beam pattern comprised of a plurality of element values into said row of signals after said clean limit has been reached.

26. The apparatus as defined in claim 25 wherein, said dirty beam pattern is comprised of a plurality of non-zero signal values centered about a highest signal value; and
said clean beam pattern is comprised of a plurality of non-zero signal values differing from said dirty beam pattern non-zero signal values and centered about a highest signal value.

27. The apparatus as defined in claim 26 wherein, said noise-reduction apparatus includes user input means and scaling means connected to said input means, said scaling means being formed to produce user selected scaling of gain of the signal values in said clean beam pattern, and said scaling means further scaling the gain of said dirty beam pattern to equal the gain of said clean beam pattern.

28. The apparatus as defined in claim 25 wherein, said scan line processor circuits add said clean beam pattern to said clean component intensity valued at locations determined by the location of each clean component stored for said row of signals.

29. The apparatus as defined in claim 23 wherein, said clean limit is provided as an intensity signal positioned at a known location in said row of signals; and
said scan line processor means repeats said find and subtract steps until the next maximum intensity value signal is the image signal at said known location in said row.

30. The apparatus as defined in claim 16 wherein, said noise-reduction apparatus includes a masking circuit connected to receive clean image signals from said scan line processor circuits and to multiply said clean image signals by the value of corresponding dirty image signals to produce masked clean image signals.

31. The apparatus as defined in claim 30 wherein, said masking circuit includes signal storage memory means connected to receive and store said dirty image signals while said dirty image signals are processed by said scan line processor circuits and control means connected to retrieve said dirty image signals from said storage means for multiplication with said clean image signals.

32. The apparatus as defined in claim 30 wherein, said masking apparatus includes scaling means connected to receive said masked clean image signals and responsive thereto to scale all values of said masked clean image signals.

33. The apparatus as defined in claim 32 wherein, said scaling means is user-controllable to adjust the amount of scaling.

34. The apparatus as defined in claim 16 wherein, said noise-reduction apparatus includes dirty signal scaling means connected to receive said dirty image signals from said echographic imaging apparatus, said data scaling means including user input means responsive to user input to select a scaling factor for scaling of the values of said dirty image signals.

35. The apparatus as defined in claim 34 wherein, said noise-reduction apparatus includes input memory means connected to receive and address dirty signals from said imaging apparatus and formed to write dirty image signals into said scan line processor circuits.

36. The apparatus as defined in claim 35 wherein, said noise-reduction apparatus includes held dirty signal memory means connected to receive dirty image signals from said input storage memory means and formed to hold said dirty image signals for a time duration substantially equal to the time required to process a row of said dirty image signals in said scan line processor means.

37. The apparatus as defined in claim 35 wherein, said image display means includes result memory means connected to receive clean image signals from said scan line processor circuits and formed to store said clean image signals in an order suitable for display as image frames.

38. The apparatus as defined in claim 37 wherein, said noise-reduction apparatus includes masking multiplier means electrically connected between said scan line processor circuits and said result memory means for receipt of clean image signals and electrically connected to receive dirty image signals from said dirty signal memory means, said masking multiplier means being responsive to receipt of said clean image signals and said dirty image signals to multiply ones of said clean image signals times corresponding ones of said dirty image signals.

39. The apparatus as defined in claim 38 wherein, said scan line processor circuits are each connected to a common beam memory means for receipt of dirty beam pattern signal elements and clean beam pattern signal elements therefrom.

40. The apparatus as defined in claim 38 wherein, said scan line processor circuits are each connected to a common control signal sequencing means for simultaneous identical control steps required for noise-component reduction.

41. The apparatus as defined in claim 16 wherein, said noise-reduction apparatus further includes transfer and storage means formed to transfer image signals to and from said scan line processor circuits, initialization means formed to initialize said scan line processor circuits, and control signal memory means for controlling processing steps in said scan line processor circuits.

42. The apparatus as defined in claim 41 wherein, said transfer and storage means includes a two-sided random access memory device having data transfer and initialization signals on one memory side and data processing control signals on opposite memory side, said memory device being connected to receive side selection signals for simultaneous transfer and initialization by said one memory side while data processing in said scan line processor circuits is being controlled by said opposite memory side.

43. The apparatus as defined in claim 16 wherein, said scan line processor circuits include negative value write prevent means connected to prevent writing of negative values for said dirty image signals during signal processing.

44. The apparatus as defined in claim 16 wherein, said scan line processor circuits each include address counter means formed to prevent writing to memory outside of dirty image signal address space.

45. A process of reduction of noise components in dirty image signals produced by an echographic imaging apparatus comprising:
inputting said dirty image signals from said echographic imaging apparatus on a row-by-row basis into a plurality of scan line processor circuits with a plurality of dirty image signals all from the same signal row being input into each of said scan line processor circuits; and
substantially simultaneously removing noise components from each row of dirty image signals by each of said scan line processor circuits by deconvolving at least some of said noise components from said dirty image signals in said row to produce a row of clean image signals.
thereafter assembling said clean image signals from each of said plurality of scan line processor circuits for a noise-reduced image frame.

46. The process as defined in claim 45, and after said removing step, assembling the rows of said clean image signals from each of said plurality of scan line processor circuits for display as a noise-reduced image frame.

47. The process as defined in claim 46 wherein,
said inputting step is accomplished by inputting at least one of phase image signals and amplitude image signals.

48. The process as defined in claim 46 wherein,
said removing step is accomplished in each scan line processor circuit independently of the noise components present in other rows of dirty image signals.

49. The process as defined in claim 48 wherein,
said inputting step is accomplished by inputting substantially all said dirty image signals comprising a row in an image frame into each of said plurality of scan line processor circuits.

50. The process as defined in claim 48 wherein,
said removing step is accomplished by deconvolving said noise components in said scan line processor circuits using a CLEAN algorithm.

51. The process as defined in claim 48 wherein,
said removing step is accomplished by deconvolving each of said scan line processor circuits a one-dimensional dirty beam pattern for said echographic imaging apparatus from said dirty image signals in each row.

52. The process as defined in claim 48, and the step of:
after said removing step and before said assembling step, adding image smoothing signal elements to said clean image signals in each of said scan lines of clean image signals.

53. The process as defined in claim 52 wherein,
said adding step is accomplished by each of said scan line processor circuits by adding a clean beam pattern compressed of a plurality of elements to clean component signals for said row.

54. The process as defined in claim 45, and the step of:
prior to said removing step, determining signal intensity values for elements comprising a dirty beam pattern for said echographic imaging apparatus;
prior to said removing step, determining signal intensity values for elements comprising a clean beam pattern for smoothing images from said echographic imaging apparatus;
during said removing step, iteratively finding a plurality of successive maximum signal intensity values for dirty image signals in a scan line, and after finding each maximum signal intensity value, storing intensity values for clean component signals based upon the found maximum intensity value for said dirty image signals, subtracting said signal intensity values for said elements of said dirty beam pattern from dirty image signals having locations determined by the location of each found maximum signal intensity value; and
after said removing step and before said assembly step, adding signal intensity values for elements of said clean beam pattern to clean component signals at locations determined by the location of each of said clean component signals in said scan line.

55. The process as defined in claim 54 and the step of:
prior to said removing step, multiplying in a multiplying device all of the values of said elements comprising said dirty beam pattern by a scaling factor, and
storing said products as the values of said elements comprising said clean beam pattern.

56. The process as defined in claim 55, and the step of:
after said multiplying step, scaling said masked clean image signals in a scaling device.

57. The process as defined in claim 54, and the step of:
prior to said assembling step, multiplying in a signal multiplying device signal intensity values of said dirty image signals by corresponding signal intensity values of said clean image signals on an image signal-by-image signal basis to produce masked clean image signals.

58. The process as defined in claim 46, and the step of:
prior to said assembling step, multiplying in a signal multiplying device signal intensity values of said dirty image signals time corresponding signal intensity values of said clean image signals on an image signal-by-image signal basis to produce masked clean image signals.

59. The process as defined in claim 58, and
after said multiplying step, scaling said masked clean image signals in a scaling device.

60. The process as defined in claim 45 wherein,
said inputting step is accomplished by substantially simultaneous inputting a row of dirty image signals into a sufficient number of scan line processor circuits so that an entire image frame can have noise components reduced therein in a time period enabling real-time display of successive image frames.

61. The process as defined in claim 60 wherein,
said inputting step is accomplished by inputting rows of said dirty image signals into a sufficient number of scan line processors to enable display of successive image frames at a rate of at least about 15 image frames per second.

62. The process as defined in claim 45 wherein,
said dirty image signals are received from said echographic imaging apparatus in rows having polar coordinates; and
prior to said removing step, transforming said dirty image signals by signal rotation means into rows having Cartesian-like coordinates.

63. The process as defined in claim 62, and
after said removing step, transforming said clean image signals by signal rotation means into rows having polar-like coordinates.

64. The process as defined in claim 62 wherein, during said transforming step, filling out said image frame by one of replicating signal values and averaging signal values by said signal rotation means to accommodate transformation from polar-like coordinates to Cartesian-like coordinates.

65. The process as defined in claim 62, and
prior to said inputting step, scaling the intensity values of said dirty image signals by scaling means.

66. A process of reducing signal noise in an ultrasonic imaging apparatus having a transducer array with a plurality of transducers comprising the step of:
connecting a noise-reduction apparatus to receive correlated dirty image signals in raster scan polar-like coordinates to an ultrasonic imaging apparatus;
transforming said dirty image signals into Cartesian-like coordinates by said noise reduction apparatus to produce a plurality of adjacent Cartesian-like rows of a plurality of side-by-side dirty image signals;
inputting a plurality of rows of dirty image signals substantially simultaneously into a corresponding plurality of scan line processor circuits in said noise reduction apparatus;
storing intensity values for a dirty beam pattern for said array in said noise-reduction apparatus;
substantially simultaneously in said scan line processor circuits, iteratively finding successive maximum intensity values of dirty image signals in each row of signal, and after each finding step, storing said intensity value and location and subtracting the stored intensity values for said dirty beam pattern from said dirty image signals to produce a row of clean image signals; and
thereafter assembling in said noise reduction apparatus the plurality of rows of clean image signals from said plurality of scan line processor circuits into an image frame.

67. The process as defined in claim 66 wherein,
after said assembling step, displaying said image frame on at least one of said ultrasonic imaging apparatus and an image display device.

68. The process as defined in claim 67, and the step of:
prior to said displaying set, transforming said clean image signals to raster scan polar-like coordinates by said noise reduction apparatus.

69. The process as defined in claim 68, and the step of scaling intensity values of at least one of said dirty image signals and said clean image signals by said noise reduction apparatus to enhance image contrast.

70. The process as defined in claim 68, and the step of masking said clean image signals with said dirty image signals using said noise reduction apparatus to reduce image processing artifacts.

71. The process as defined in claim 69, and the step of prior to said masking step, determining clean beam pattern for smoothing signal images, and adding intensity values for said clean beam pattern to clean image signals in the rows of signals.

* * * * *

UNITED STATES PATENT AND TRADEMARK OFFICE
CERTIFICATE OF CORRECTION

PATENT NO. : 5,299,577

DATED : April 5, 1994

INVENTOR(S) : Fredrick B. Brown and Nathan Cohen

It is certified that error appears in the above-identified patent and that said Letters Patent is hereby corrected as shown below:

Column 3, line 8, "Side lobe" should be beginning of new paragraph.

Column 5, line 18, after "FIG. 4" delete "4A and 4B are" and insert --map showing the relationship of FIGURES 4A and 4B, which illustrate portions of a--

Column 5, after line 19 insert new paragraphs as follows:
--FIG. 4A is a block diagram of one-half of the signal interface card.
FIG. 4B is a block diagram of the other half of the signal interface card of FIGURE 4A.--

Column 5, line 20, after "FIG. 5" delete "5-1 and 5-2 are".

Column 5, after line 21, insert new paragraphs as follows:
--FIGURE 5-1 is a block diagram of one-half of the scan line interface card.
FIGURE 5-2 is a block diagram of the other half of the scan line interface card of FIGURE 5-1.--

UNITED STATES PATENT AND TRADEMARK OFFICE
CERTIFICATE OF CORRECTION

PATENT NO. : 5,299,577

DATED : April 5, 1994

INVENTOR(S) : Fredrick B. Brown and Nathan Cohen

It is certified that error appears in the above-identified patent and that said Letters Patent is hereby corrected as shown below:

Column 5, line 27, before "schematic", insert --map showing the relationship of FIGURES 6-1 and 6-2 which illustrate portions of a--.

Column 5, after line 29, insert the following paragraphs:
--FIGURE 6-1 is a schematic representation of one-half of the memory segments of one memory in the scan line processor.
FIGURE 6-2 is a schematic representation of the other half of the memory segment of one memory in the scan line processor of FIGURE 6-1.--.

Column 7, line 11, delete "and 5" and insert therefor --, 4A, 4B, 5, 5-1 and 5-2.--, and in same line, delete "FIGURE 4" and insert therefor, --FIGURES 4A and 4B--.

Column 8, line 2, delete "FIGURE 6" and insert therefor --FIGURE 6-2--.

Column 10, line 42, delete "FIGURE 4" and insert therefor, --FIGURE 4B--.

UNITED STATES PATENT AND TRADEMARK OFFICE
CERTIFICATE OF CORRECTION

PATENT NO. : 5,299,577

DATED : April 5, 1994

INVENTOR(S) : Fredrick B. Brown and Nathan Cohen

It is certified that error appears in the above-identified patent and that said Letters Patent is hereby corrected as shown below:

Column 13, line 54, delete "FIGURE 6" and insert therefor, --FIGURES 6-1 and 6-2--.

Column 14, line 51, delete "FIGURE 6" and insert therefor --FIGURES 6-1 and 6-2--.

Column 15, line 10, delete "FIGURE 6" and insert therefor --FIGURE 6-2--

Column 17, line 7, delete "FIGURE 6" and insert therefor --FIGURE 6-2--.

Column 17, line 28, delete "FIGURE 5" and insert therefor --FIGURE 5-2--.

Column 17, line 55, delete "FIGURE 6" and insert therefor --FIGURE 6-1--

Column 17, line 67, delete "FIGURE 6" and insert therefor --FIGURES 6-1 and 6-2--.

UNITED STATES PATENT AND TRADEMARK OFFICE
CERTIFICATE OF CORRECTION

PATENT NO. : 5,299,577

DATED : April 5, 1994

INVENTOR(S) : Fredrick B. Brown and Nathan Cohen

It is certified that error appears in the above-indentified patent and that said Letters Patent is hereby corrected as shown below:

Column 26, line 60, claim 8, before "frame" insert --image--.

Signed and Sealed this

Twenty-second Day of November, 1994

Attest:

BRUCE LEHMAN

Attesting Officer — Commissioner of Patents and Trademarks